(12) United States Patent
Usa et al.

(10) Patent No.: US 10,119,440 B2
(45) Date of Patent: Nov. 6, 2018

(54) OIL SEPARATOR

(71) Applicant: AISIN SEIKI KABUSHIKI KAISHA, Kariya-shi, Aichi-ken (JP)

(72) Inventors: Daigo Usa, Nagoya (JP); Kohei Hotta, Nagoya (JP); Yoshiyuki Suzuki, Anjo (JP); Kazuya Matsushima, Kariya (JP); Akihiro Yamashita, Kariya (JP); Yoshiyuki Kawai, Nagoya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 10 days.

(21) Appl. No.: 15/385,579

(22) Filed: Dec. 20, 2016

(65) Prior Publication Data

US 2017/0175601 A1 Jun. 22, 2017

(30) Foreign Application Priority Data

Dec. 21, 2015 (JP) ................. 2015-248566
Jul. 5, 2016 (JP) ................. 2016-133013

(51) Int. Cl.
*F01M 13/04* (2006.01)
*F02F 1/24* (2006.01)

(52) U.S. Cl.
CPC ............... *F01M 13/04* (2013.01); *F02F 1/24* (2013.01); *F01M 2013/0433* (2013.01); *F01M 2013/0438* (2013.01)

(58) Field of Classification Search
CPC ........... F01M 13/04; F01M 2013/0433; F01M 2013/0438; F02F 1/24
See application file for complete search history.

(56) References Cited

U.S. PATENT DOCUMENTS

| 2,600,219 | A | | 6/1952 | Diederich |
| 4,018,580 | A | | 4/1977 | Burkholz et al. |
| 4,602,595 | A | * | 7/1986 | Aoki ................. F01M 13/0416 |
| | | | | 123/41.86 |
| 8,794,221 | B2 | | 8/2014 | Kobayashi et al. |
| 2015/0059316 | A1 | * | 3/2015 | Zhou ..................... F02B 43/04 |
| | | | | 60/273 |

FOREIGN PATENT DOCUMENTS

| JP | 2008-002294 A | 1/2008 |
| JP | 2012-026321 A | 2/2012 |
| JP | 2012-255372 A | 12/2012 |
| JP | 2014-084730 A | 5/2014 |
| WO | 2013/179829 A1 | 12/2013 |

OTHER PUBLICATIONS

Extended European Search Report dated May 17, 2017, by the European Patent Office in corresponding European Patent Application No. 16199401.7-1603. (7 pages).

* cited by examiner

*Primary Examiner* — Jacob Amick
(74) *Attorney, Agent, or Firm* — Buchanan Ingersoll & Rooney PC

(57) ABSTRACT

An oil separator includes: a collecting member that collects an oil mist included in blow-by gas of an internal combustion engine; and an oil separator portion inside which the collecting member is disposed, in which the collecting member includes a plurality of wire net members stacked along a flow direction of the blow-by gas.

9 Claims, 10 Drawing Sheets

(FLOW OF BLOW-BY GAS)

OIL SEPARATOR

CROSS REFERENCE TO RELATED APPLICATIONS

This application is based on and claims priority under 35 U.S.C. § 119 to Japanese Patent Applications 2015-248566 and 2016-133013, filed on Dec. 21, 2015 and Jul. 5, 2016, respectively, the entire contents of which are incorporated herein by reference.

TECHNICAL FIELD

This disclosure relates to an oil separator.

BACKGROUND DISCUSSION

In the related art, an oil separator that performs a gas-liquid separation of oil from blow-by gas is known (for example, refer to JP2012-255372A (Reference 1)).

In above Reference 1, the oil separator that separates the oil included in the blow-by gas of an internal combustion engine is disclosed. The oil separator described in Reference 1 is disposed inside a cylinder head cover. The oil separator has a partition wall which is formed for a plurality of small holes to be penetrated in a flow path of the blow-by gas, and a collision plate disposed in a downstream side of the partition wall in an inside. Thereby, the blow-by gas of which a flow rate is increased when passing through the plurality of the small holes performs an inertial collision against the collision plate by using an inertial motion, and thus oil mist is separated from the blow-by gas. Liquid oil that is grown into droplets by adhering to a front surface of the collision plate is configured to be discharged via a drain pipe (discharge passage) disposed on a bottom surface of the oil separator.

However, in an oil separator described in above Reference 1, it is possible to separate the oil mist only by an inertial collision of blow-by gas against a collision plate. That is, while the oil mist of which a particle diameter is large to some extent can be collected by the inertial collision using an inertial motion, since mass of respective particles are too small, the oil mist of which an average particle diameter is reduced in diameter (micronized) up to approximately 1 μm or less is taken away to an outside of the oil separator along with blow-by gas flow, without performing the inertial collision against the collision plate. For this reason, there is a problem that the oil mist reduced in diameter cannot be effectively separated from the blow-by gas. Specially, in an internal combustion engine with a supercharger or the internal combustion engine in which a combustion state of an air-fuel mixture is set at a high compression ratio, since the oil mist included in the blow-by gas is likely to be reduced in diameter, separation capacity (collection performance) of the oil mist reduced in diameter is desired to be improved.

SUMMARY

Thus, a need exists for an oil separator which is not suspectable to the drawback mentioned above.

An oil separator according to an aspect of this disclosure includes a collecting member that collects an oil mist included in blow-by gas of an internal combustion engine, and an oil separator portion inside which the collecting member is disposed, and the collecting member includes a plurality of wire net members stacked along a flow direction of the blow-by gas.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described based on drawings.

First Embodiment

First, an oil separator 50 mounted on an engine 100 according to a first embodiment disclosed here will be described with reference to FIGS. 1 to 8.

Figure 1:
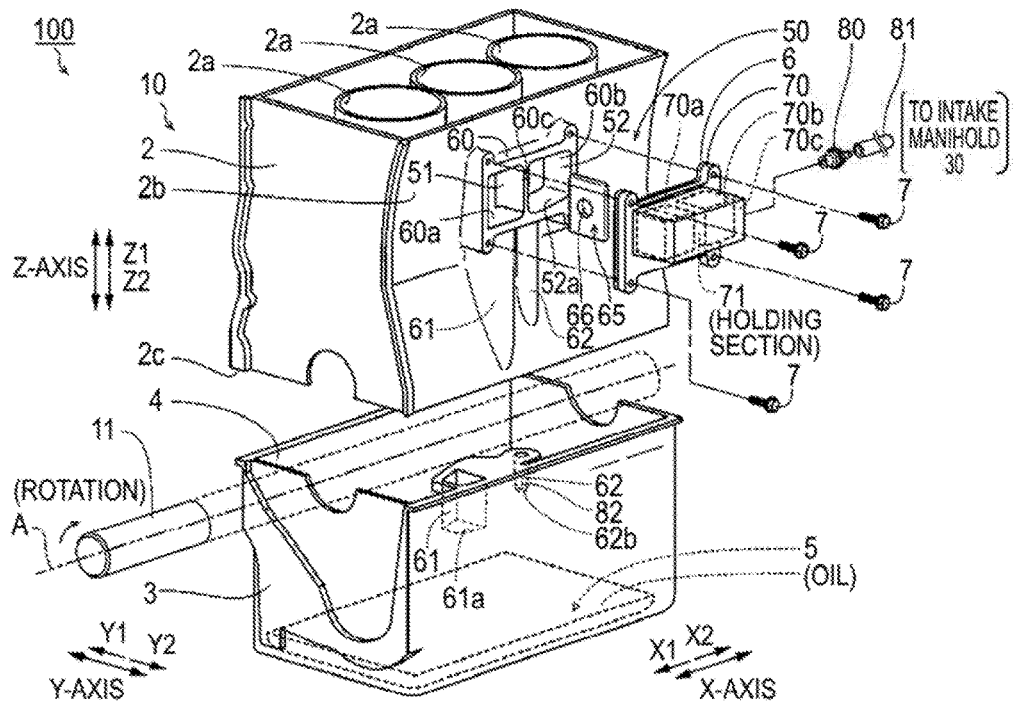
FIG. 1 is an exploded perspective view illustrating a schematic configuration of an engine body according to a first embodiment disclosed here.
Figure 2:
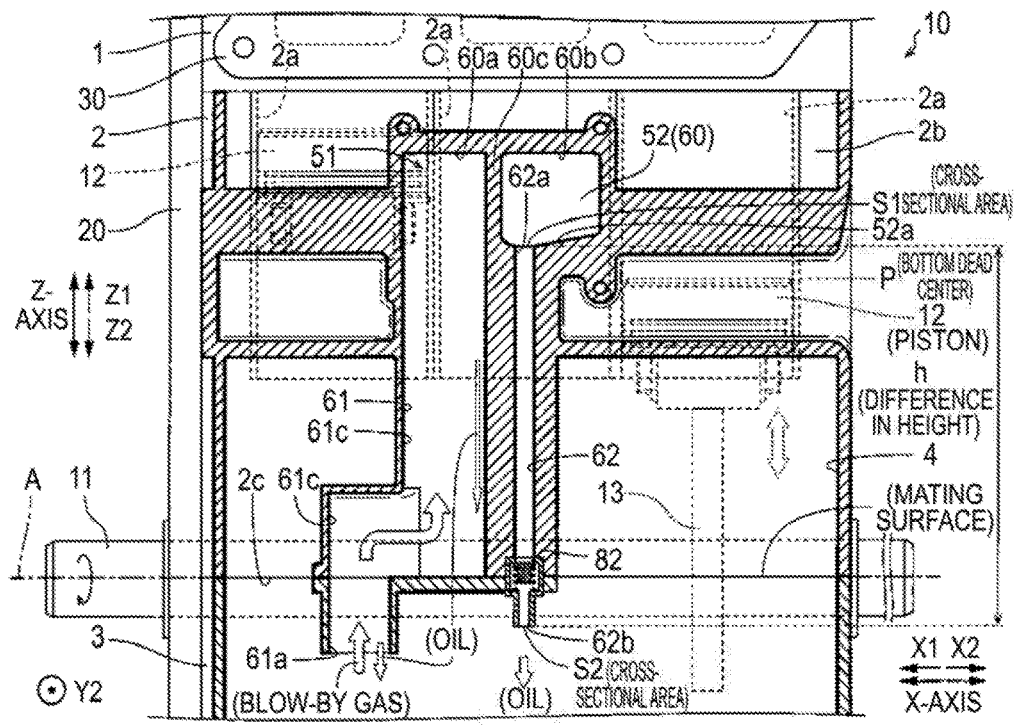
FIG. 2 is a partial cross-sectional view in a case where the engine body according to the first embodiment disclosed here is viewed from a side.

The oil separator 50 according to a first embodiment disclosed here, as illustrated in FIG. 1, is disposed in the engine 100 (example of internal combustion engine) with a natural intake type and serial 3-cylinder type. The engine 100, as illustrated in FIGS. 1 and 2, is provided with an engine body 10 including a cylinder head 1 (refer to FIG. 2) of aluminum alloy, a cylinder block 2, and a crank case 3. A cylinder head cover (not illustrated), a chain cover 20 (refer to FIG. 2), an intake manifold 30 (refer to FIG. 2), and an exhaust manifold (not illustrated) are mounted on the engine body 10. The engine 100 is installed in an engine room (not illustrated) in a state where a crankshaft 11 is aligned in a front and back direction (X-axis direction) of a vehicle (not illustrated).

Figure 4:
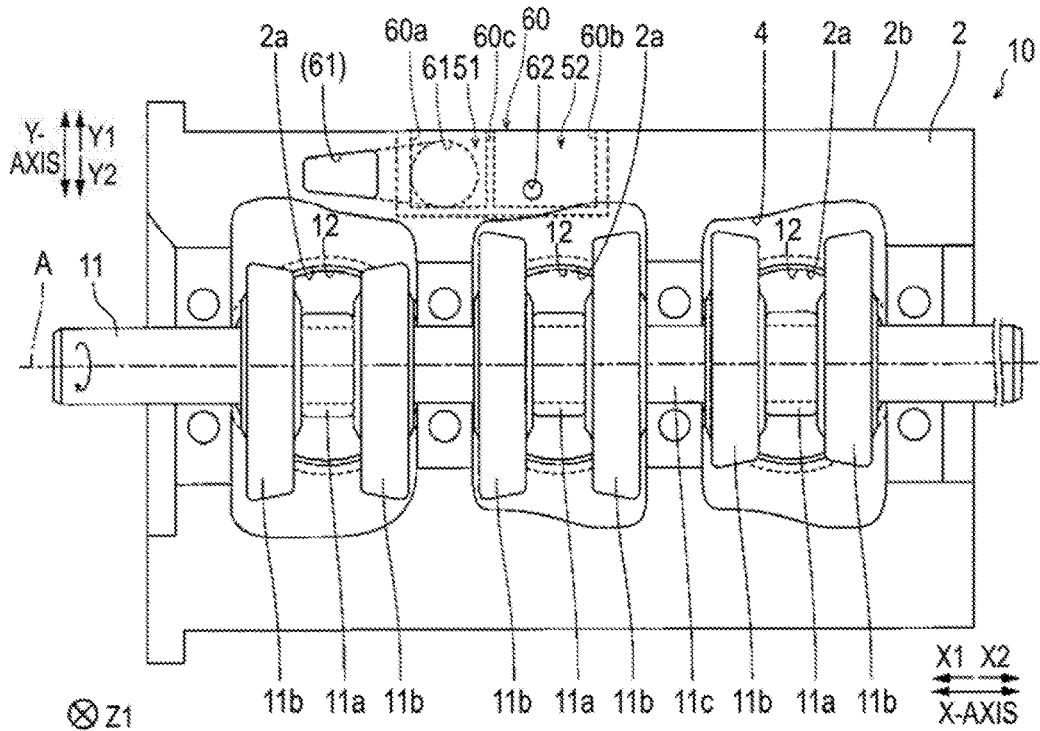
FIG. 4 is a view illustrating a structure of a case where the engine body according to the first embodiment disclosed here is viewed from below.

A crank chamber 4 is formed in the engine body 10 by the cylinder block 2 and the crank case 3 which is fastened to a lower side thereof. The crankshaft 11 which is rotatably connected around an axis of rotation A (X-axis) via a piston 12 and a connecting rod 13 is disposed in the crank chamber 4. As illustrated in FIG. 4, a crank pin 11a of which a rotation axis is eccentric in just below of respective cylinders 2a, and counterweights 11b sandwiching the crank pin 11a are integrally connected to a main journal 11c in the crankshaft 11. As illustrated in FIG. 2, in the crankshaft 11, the axis of rotation A is aligned with a height position (Z-axis direction) of a mating surface between the cylinder block 2 and the crank case 3. An oil pan 5 (refer to FIG. 1) storing oil (lubricant) is disposed in the crank case 3. The oil is pumped into the engine body 10 by an oil pump (not illustrated) and is supplied to around the piston 12 or around the crankshaft 11. Thereafter, the oil flows down by oil's own weight and returns to the oil pan 5.

The engine 100 is configured so that blow-by gas is recirculated via the intake manifold 30. The blow-by gas indicates hydrocarbons diffused and leaked from a gap between an inner wall surface of the cylinder 2a and the piston 12 into the crank chamber 4, and non-combusted air-fuel mixture including the gas diffused and leaked during combustion. A liquid oil with a large particle diameter to be scattered in the crank chamber 4, and an oil mist with a small particle diameter ($\varphi$ 1 to 2 μm or less) of which a particle diameter is smaller than that of the liquid oil are mixed in the blow-by gas.

Figure 3:
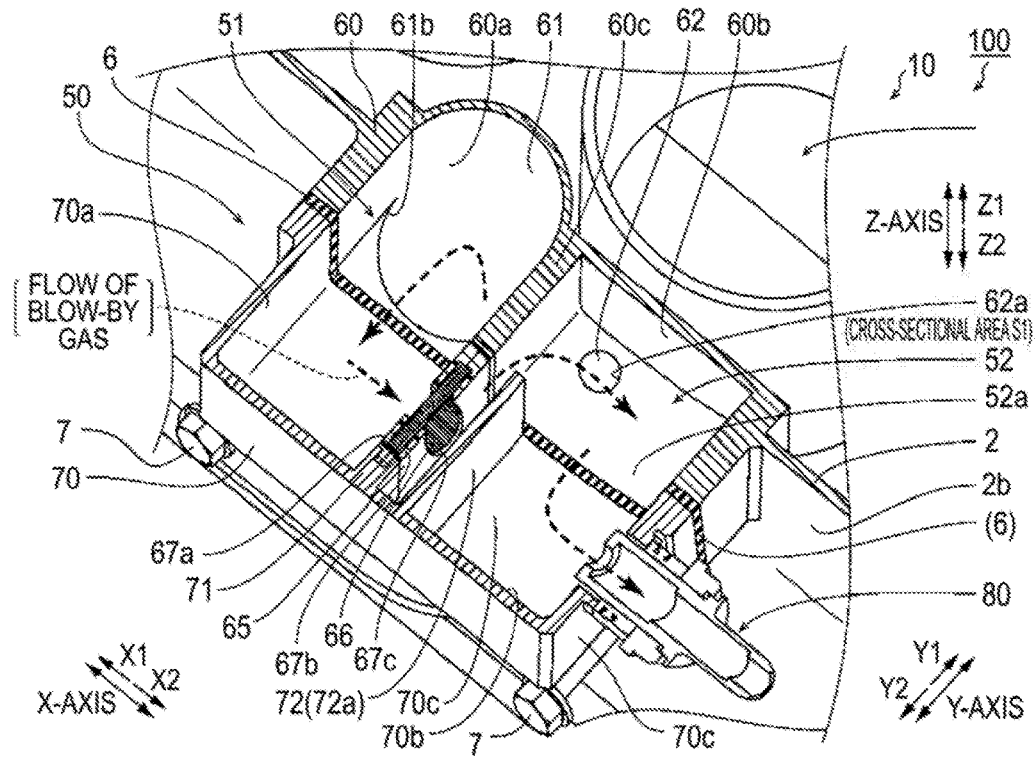
FIG. 3 is a perspective view illustrating a structure of an oil separator according to the first embodiment disclosed here.

Accordingly, the oil separator 50 has a function that performs a gas-liquid separation of the blow-by gas. That is, as illustrated in FIGS. 2 and 3, the blow-by gas in the crank chamber 4 is sucked into the oil separator 50 by negative pressure of an intake system (intake manifold 30) and oil components (oil with large particle diameter or oil mist with the small particle diameter) included in the blow-by gas are separated into the gas and the liquid. The liquid oil after the gas-liquid separation is returned to the crank chamber 4 (oil pan 5). As illustrated in FIG. 1, one PCV valve 80 (example of control valve) which controls a flow rate of the blow-by gas, and a connecting hose 81 which connects the PCV valve 80 and the intake manifold 30 (refer to FIG. 2) of the engine 100 are disposed at a downstream of the oil separator 50. Thereby, the blow-by gas from which the oil is separated is recirculated into the intake manifold 30 via the PCV valve 80 and the connecting hose 81, and thus ventilation of the crank chamber 4 is performed. Hereinafter, a configuration of the oil separator 50 (structure) will be described in detail.

Detailed Structure of the Oil Separator

The oil separator 50, as illustrated in FIGS. 1 and 3, includes a first portion 60 and a second portion 70. The first portion 60 is integrally formed in the cylinder block 2 in a state where the portion is recessed with a recessed shape in a direction of the arrow Y1 on a side wall section 2b of Y2 side of the cylinder block 2. The first portion 60 includes recessed sections 60a and 60b which are partitioned from each other in the X-axis direction and separated by a partition wall section 60c. The second portion 70 of aluminum alloy also has a function as a cover member, and includes the recessed sections 70a and 70b which are partitioned from each other in the X-axis direction and separated by a holding section 71.

In the first embodiment, the oil separator 50 is configured to be mounted by four bolt members 7 (refer to FIG. 1) in a state of facing the second portion 70 as the cover member in the direction of the arrow Y1, while sandwiching a gasket 6 (refer to FIG. 3) from a side (Y2 side) of the cylinder block 2 with respect to the first portion 60. When the second portion 70 is mounted on the first portion 60, the recessed section 60a and the recessed section 70a face each other, and the recessed section 60b and the recessed section 70b face each other. Thereby, as illustrated in FIG. 3, a first chamber 51 and a second chamber 52 which are partitioned from each other are configured to be formed in the oil separator 50. As illustrated in FIGS. 1 and 3, the first chamber 51 and the second chamber 52 are disposed at substantially the same height with each other, viewed in a horizontal direction (X-axis direction).

As illustrated in FIGS. 2 and 3, the first portion 60 includes a suction passage 61 of the blow-by gas disposed at the first chamber 51 side, and a drain passage 62 (example of discharge passage) disposed at the second chamber 52 side and discharges the oil separated from the blow-by gas into the oil pan 5. The suction passage 61 and the drain passage 62 are formed in the crank case 3 (refer to FIG. 1) in which a lower end section is partially connected (fastened) to the cylinder block 2. The suction passage 61 extended in the Z-axis direction has a suction port 61a of the blow-by gas (refer to FIG. 2) which opens into the crank chamber 4, and an introduction port 61b of the blow-by gas (refer to FIG. 3) which opens into the first chamber 51. The suction passage 61 is three-dimensionally bent between the suction port 61a and the introduction port 61b.

Figure 7:
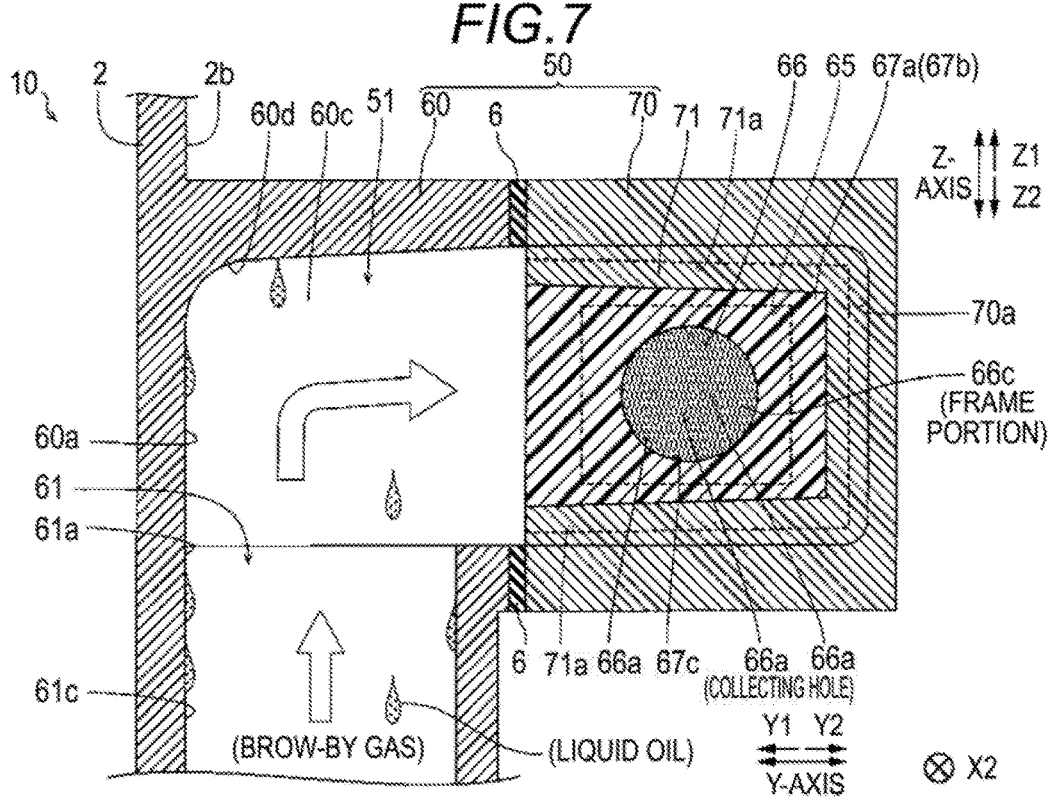
FIG. 7 is a view illustrating an internal structure of the oil separator according to the first embodiment disclosed here.

Accordingly, as illustrated in FIG. 2, the blow-by gas is sucked in an arrow Z1 direction from the suction port 61a once changes an orientation in an arrow X2 direction, and again changes the orientation in the arrow Z1 direction. Thereafter, the blow-by gas passes through the suction passage 61, as illustrated in FIGS. 3 and 7, and is introduced into the first chamber 51 from the introduction port 61b. Therefore, the blow-by gas is circulated in the first chamber 51, while changing the orientation in an arrow Y2 direction by a rounded shape of a ceiling section 60d (refer to FIG. 7). At this time, by repeating inertial collision against the inner wall surface 61c to which the blow-by gas is bent, the oil (liquid oil) with the large particle diameter is separated. Thereby, the suction passage 61 which is three-dimensionally bent is configured to serve as a liquid oil separation section.

As illustrated in FIG. 4, a position of the suction port 61a (refer to FIG. 2) is disposed at a lower region of the cylinder 2a. The suction passage 61 is extended to a position between the cylinders 2a which are adjacent and bent in the arrow X2 direction in the cylinder block 2, extended in an upper side (arrow Z1 direction), and connected to the recessed section 60a (first chamber 51). Although the shapes of an opening shape of the suction port 61a and a cross-sectional shape (circle) of the suction passage 61 after bending are different from each other, cross-sectional areas of these are equal to each other. The drain passage 62 is disposed at a position slightly spaced from the suction passage 61 in the arrow X2 direction. As illustrated in FIGS. 2 and 3, the drain passage 62 has an oil inlet 62a which opens into the second chamber 52, and an oil outlet 62b (refer to FIG. 2) which opens into the crank chamber 4. A bottom surface 52a of the second chamber 52 (including the bottom surface 70e of recessed section 70b) is inclined so that a position of the oil inlet 62a is the lowermost portion in the second chamber 52.

In the first embodiment, as illustrated in FIG. 2, the oil inlet 62a is positioned at the upper side (Z1 side) than a bottom dead center P of the piston 12 in the engine 100, and the oil outlet 62b is positioned at the lower side (Z2 side) than a lower end surface 2c of the cylinder block 2. In this case, a difference in height h from the oil inlet 62a to the oil outlet 62b is set to be equal to or greater than 100 mm. That is, even in a case where intake negative pressure of the engine body 10 is maximum value (a case where pressure loss of gas flow path side is maximum value), the difference in height h is ensured, so that an oil surface of an oil head (liquid column of the oil) formed in the drain passage 62 is held in the drain passage 62. The cross-sectional area S2 of the oil outlet 62b is smaller than the cross-sectional area S1 of the oil inlet 62a. A check valve 82 (example of a backflow prevention structure) for the oil flowing down the drain passage 62 is prevented from flowing back to the oil inlet 62a side is mounted on the oil outlet 62b. A force to close the check valve 82 is set to be the substantially same as mass of the oil head formed in the drain passage 62. Accordingly, the check valve 82 is opened only by the amount that the oil head exceeds a predetermined height, and the oil is configured to be discharged from the oil outlet 62b.

Figure 5:
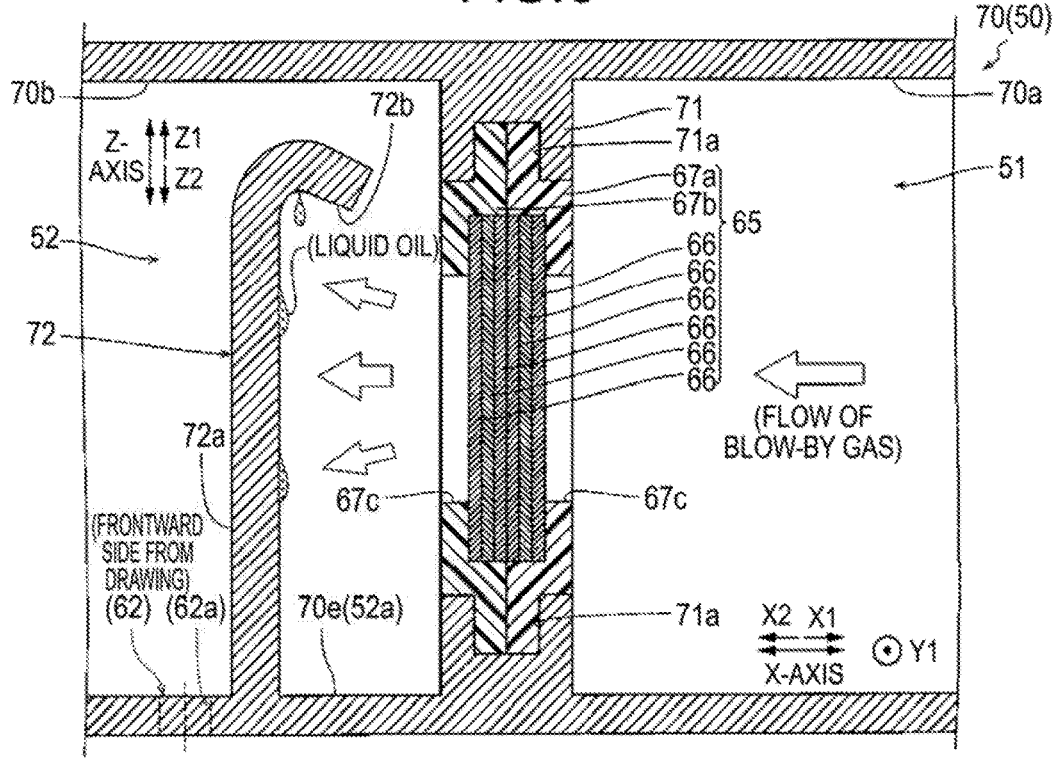
FIG. 5 is a cross-sectional view illustrating an internal structure of the oil separator according to the first embodiment disclosed here.

In the first embodiment, as illustrated in FIGS. 3, 5, and 7, the second portion 70 has a collecting member 65 disposed in the holding section 71. The collecting member 65 is configured to overlap a plurality of a wire net members 66 (six sheets in the embodiment) in which a plurality of collecting holes 66a collecting the oil mist are arranged with a mesh shape. The individual wire net members 66 are configured of an expanded metal formed of an integral structure. A cut is made in a zigzag manner with respect to one metal plate. Thereafter, by stretching the metal plate in a direction in which the cut is open, the expanded metal is manufactured by processing the mesh with a rhombus or a hexagonal shape. The collecting member 65 formed of a wire net of the integral structure is a very suitable member (part) for collecting the oil mist in terms of excellent heat resistance under conditions exposed to the blow-by gas with high temperature, in addition to easiness in manufacture, easiness in processing of the form.

Figure 8:
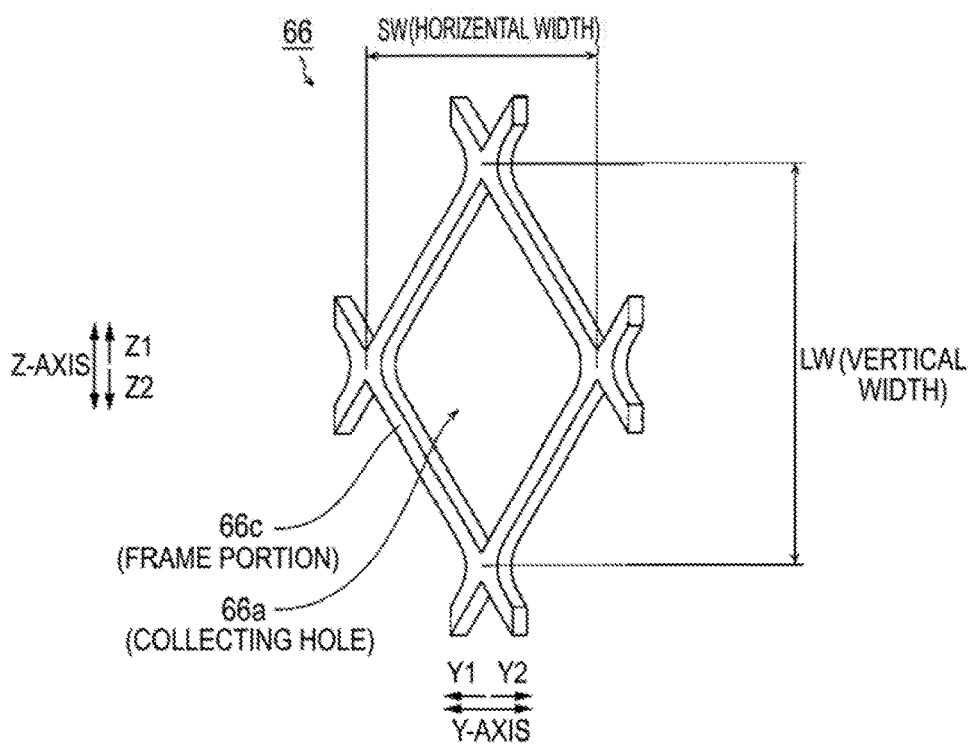
FIG. 8 is a view illustrating a detailed structure of a collecting member according to the first embodiment disclosed here.

As illustrated in FIG. 8, the wire net member 66 is formed so that the ratio of a horizontal width SW (Y-axis direction) and a vertical width LW (Z-axis direction) is approximately 1:2 in the collecting holes 66a (frame portion 66c) having the rhombus shape. For example, the horizontal width SW is set to be approximately 0.5 mm, and the vertical width LW is set to be approximately 1 mm. Six wire net members 66 overlap each other in a state where meshes (a plurality of the collecting holes 66a) are shifted in the horizontal direction and a vertical direction. As illustrated in FIG. 7, the collecting member 65 is mounted in the inside of the second portion 70 (holding section 71) so that a longitudinal direction of the collecting holes 66a (frame portion 66c) arranged in the mesh shape coincides with a gravity direction (arrow Z2 direction) in which the collected oil flows down. Thereby, the oil is configured to easily flow down by using its own weight.

As illustrated in FIG. 5, the collecting member 65 is sandwiched by holding members 67a and 67b made of resin, in a state where the six wire net members 66 having the same plane area are overlapped each other along the flow direction (arrow X2 direction) of the blow-by gas. The six wire net members 66 (collecting member 65) sandwiched by the holding members 67a and 67b are inserted into a groove section 71a of the holding section 71 in the arrow Y2 direction, and mounted on the second portion 70. Thereby, in a state of being disposed between the first chamber 51 and the second chamber 52, the collecting member 65 is configured to serve as an oil mist separation section that collects (catches) the oil mist of the small particle diameter included in the blow-by gas which circulates from the first chamber 51 toward the second chamber 52.

As illustrated in FIGS. 5 and 7, an opening 67c having an inner diameter of approximately 20 mm is formed in a center region of the holding members 67a and 67b. That is, in a state where the collecting member 65 is mounted on the holding section 71, the wire net member 66 (frame portion 66c) exposes to an inner side of the opening 67c. Except for an exposed region of the wire net member 66 is the holding section 71 and the holding member 67a that divides the first chamber 51 and the second chamber 52, a flow of the blow-by gas flowed into the first chamber 51 is throttled by the opening 67c (exposed region of the wire net member 66). In a state where a flow rate of the blow-by gas is increased by throttling of the opening 67c, the entire amount thereof passes through the collecting member 65.

As illustrated in FIG. 5, the second portion 70 integrally has a collision plate 72 with a rib shape disposed in the route of the second chamber 52 after passing through the collecting member 65. In the second chamber 52, the liquefied oil collected by a plurality of the collecting holes 66a of the wire net member 66 partially collides with the collision plate 72 riding on the momentum of the blow-by gas flow. Here, a front surface of the collision plate 72 may have a micro relief (unevenness). Furthermore, the oil may be easily repelled, for example, using a resin coating agent with oil repellency. Thereby, the oil that is collided with the collision plate 72 is satisfactorily held (caught) by using the recessed section. While being repelled on the front surface of the recessed section, the oil flows down and easily introduced into the bottom surface 52a of the second chamber 52. The unevenness shapes of the front surface of the collision plate 72 are preferably formed that a plurality of the recessed sections with stripe shapes extend linearly obliquely downward (shape widening downward) or downward (arrow Z2 direction). The oil that cannot be collected from the blow-by gas at the time of passing the collecting member 65 collides with the collision plate 72. Thereby, the liquid oil is further caught in the collision plate 72. The collision plate 72 has a wall section 72a that vertically rises from the bottom surface 70e of the recessed section 70b in the second chamber 52, and a return section 72b that is bent to the collecting member 65 sides from a tip end of the wall section 72a. Thereby, the blow-by gas is configured so as not to be directly sucked to the PCV valve 80 (refer to FIG. 3) beyond the collision plate 72. The second chamber 52 in which the volume is expanded is disposed in a downstream of the collision plate 72.

Figure 6:
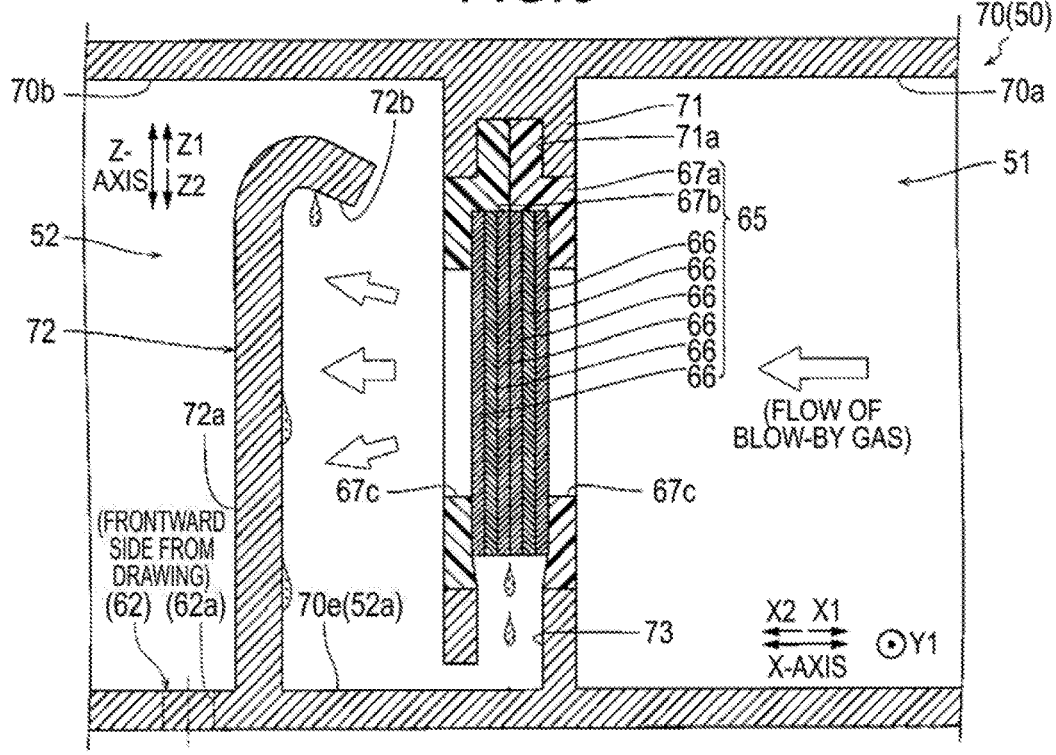
FIG. 6 is a cross-sectional view illustrating an internal structure of the oil separator according to the first embodiment disclosed here.

As illustrated in FIG. 6, a cavity section 73 connected to the second chamber 52 is formed in a vicinity of center of the collecting member 65 and a portion of the holding section 71 of a lower side (Z2 side). Accordingly, the oil flowed from the wire net member 66 is circulated to the bottom surface 52a of the second chamber 52 via the cavity section 73, and introduced to the oil inlet 62a (refer to FIG. 3). As illustrated in FIG. 3, the PCV valve 80 is screwed and fixed to the wall section 70c opposite to the holding section 71 of the recessed section 70b. Accordingly, the PCV valve 80 is disposed at the second chamber 52 side.

Function at a Time of the Oil Separator Working.

The oil separator 50 functions as follows according to the above configuration. Immediately after the start of the engine 100, the blow-by gas is sucked from the suction port 61a by the negative pressure of the intake system. Thereby, as illustrated in FIG. 3, the blow-by gas is immediately circulated in the suction passage 61 which is designed to be smaller pressure loss than water head loss of the oil. The blow-by gas repeats the inertial collision against the inner wall surface 61c of the suction passage 61. Thereby, the oil with the large particle diameter is collected in the suction passage 61 including the first chamber 51. The liquid oil flows down through the inner wall surface 61c and returned to the suction port 61a. The entire amount of the blow-by gas from which the liquid oil is separated is introduced, while the flow rate increase of the blow-by gas flow is achieved in the center region of a passage cross section in the collecting member 65.

The oil mist with the small particle diameter is collected in the collecting member 65. That is, since the size of the mesh of the wire net formed in the collecting member 65 by stacking several layers of the wire net members 66 is micronized, when even the oil mist reduced in diameter (micronized) and in which the mass of the individual particles is very small passes through the micronized mesh of the wire net (complex flow path), the individual mist particles adheres with a high probability to the frame portion 66c of the collecting holes 66a having the rhombus shape. The oil mist is collected in this manner, and the oil liquefied the wire net member 66 flows down. The oil collected in the wire net member 66 is blown into the collision plate 72 of the downstream and flows down along the wall section 72a. Furthermore, the oil mist is dropped by gravity from the blow-by gas flow in which the flow rate is reduced in the second chamber 52 of wide volume at the downstream of the collision plate 72. Thereby, the oil separated in the second chamber 52 side including the collecting member 65 is collected in the bottom surface 52a. The oil collected in the bottom surface 52a is drawn into the oil inlet 62a and absorbed into the oil head in the drain passage 62. In the drain passage 62, the height of the oil head is maintained so that the water head loss of the oil is larger by a predetermined amount than the pressure loss of the gas flow path side at that point. The oil that exceeds the balance amount of the pressure with the blow-by gas side of the oil head pushes down the check valve 82. Therefore, the oil discharged from the oil outlet 62b returns to the oil pan 5 (refer to FIG. 2). The blow-by gas in which the oil components are separated is recirculated to the intake manifold 30 via the PCV valve 80.

Effects of the First Embodiment

In the first embodiment, it is possible to obtain the following effects.

In the first embodiment, as described above, the suction passage 61 of the blow-by gas that is disposed at the first chamber 51 side is formed in the first portion 60. The collecting member 65 that is disposed between the first chamber 51 and the second chamber 52 and collects the oil mist included in the blow-by gas, and the collision plate 72 that is disposed in the route of the second chamber 52 side and causes the oil collected by the collecting member 65 to collide are disposed in the second portion 70. Thereby, in the oil separator 50, it is possible to produce the blow-by gas flow of one direction that means which the blow-by gas generated in the crank chamber 4 is introduced into the first chamber 51 via the suction passage 61, the entire amount of the blow-by gas introduced into the first chamber 51 is passed through the collecting member 65, and circulated into the second chamber 52. At this time, while collecting the oil mist by the collecting member 65, the collected oil is collides with the collision plate 72 and the liquid oil is caught. Therefore, the liquid oil can be returned to the crank chamber 4 from the drain passage 62. That is, since the oil can be separated from the entire amount of the introduced blow-by gas without causing uneven distribution of the blow-by gas flow in the oil separator 50, the oil separation capacity of the entire oil separator 50 can be sufficiently exhibited.

In the first embodiment, the first portion 60 includes the drain passage 62 that discharges the oil, causes the oil inlet 62a which opens to the second chamber 52 of the drain passage 62 in the engine 100 to position upwards than the bottom dead center P of the piston 12, and causes the oil outlet 62b which opens to in the engine 100 of the drain passage 62 to position downwards than the lower end surface 2c of the cylinder block 2. Thereby, even in a case where the oil separator 50 is disposed in the cylinder block 2, the difference in height h of the drain passage 62 from the oil inlet 62a to the oil outlet 62b can be sufficiently ensured. Accordingly, since the oil head can be surely formed in the drain passage 62, the blow-by gas can be surely circulated in the suction passage 61 of the blow-by gas that the pressure loss is smaller than the oil head. Thereby, the blow-by gas from the crank chamber 4 can be easily circulated into the first chamber 51, the collecting member 65 and the second chamber 52 in order.

In the first embodiment, the first portion 60 is integrally disposed in the cylinder block 2, and the second portion 70 is configured of the cover member that covers the first portion 60. Thereby, by mounting the second portion 70 in the cylinder block 2, the oil separator 50 having the first chamber 51 and the second chamber 52 can be disposed in the engine 100. That is, unlike a case of mounting separate part of an oil separating member in the process before mounting the second portion 70, the manufacturing process of the oil separator 50 is simplified and an internal structure can be simplified.

In the first embodiment, the PCV valve 80 that controls the flow of the blow-by gas is disposed at the second chamber 52 side of the second portion 70. Thereby, since it is possible to assign a function of adjusting the flow of blow-by gas in the second portion 70, by connecting the PCV valve 80 and the intake manifold 30, a reflux route of the blow-by gas can be easily configured.

In the first embodiment, the cross-sectional area S2 of the oil outlet 62b is smaller than the cross-sectional area S1 of the oil inlet 62a disposed in the cylinder block 2. Thereby, the oil separated from the blow-by gas can be smoothly flowed into the oil inlet 62a, and it may be easier to fill the oil into the drain passage 62, as much as the cross-sectional area S2 is throttled than the cross-sectional area S1. That is, since the oil head can be rapidly formed in the drain passage 62, the oil head can be rapidly formed, the blow-by gas can be rapidly circulated in the suction passage 61 of the blow-by gas that the pressure loss is smaller than the oil head of the drain passage 62 of the oil.

In the first embodiment, the check valve 82 for the oil flowing down the drain passage 62 is prevented from flowing back to the oil inlet 62a side is disposed in the drain passage 62. Thereby, the oil filled into the drain passage 62 can be prevent from being again returned into the second chamber 52, and from being taken away from the oil separator 50 to the intake system (intake manifold 30). Since the backflow of oil does not occur in the drain passage 62, the blow-by gas can be surely prevented from being sucked into the second chamber 52 via the drain passage 62 of the oil. Accordingly, since the blow-by gas can be surely sucked into the first chamber 51 side via the suction passage 61, the oil separation capacity of the oil separator 50 can be surely maintained.

In the first embodiment, the collecting member 65 includes the wire net member 66 in which the collecting holes 66a collecting the oil mist are arranged in the mesh shape. Thereby, the oil mist can be collected at a high efficiency by the wire net member 66, the liquid oil that is liquefied and accumulated the wire net member 66 can be rapidly discharged from the wire net member 66. As compared with the case of disposing a demister, such as a wire mesh (metal scrub brush) having a filter made of a filter paper or irregularities, since the wire net member 66 itself is excellent in discharge performance of the liquid oil, clogging of the collecting holes 66a is suppressed. Therefore, it is possible to maintain the flow resistance (pressure loss) low. Thereby, it is possible to appropriately ensure the flow rate of the blow-by gas that passes through a portion of the wire net member 66. As a result, by rapidly discharging the liquid oil collected from the blow-by gas, the flow rate of the blow-by gas is appropriately ensured. Therefore, it is possible to maintain ventilation performance of the blow-by gas.

In the first embodiment, the collecting member 65 is disposed in the second portion 70 so that the longitudinal direction of the collecting holes 66a arranged in the mesh shape coincides with the gravity direction (arrow Z2 direction) in which the collected oil flows down. Thereby, the oil collected in the portion of the wire net member 66 is rapidly and surely flowed down by the oil's own weight along the longitudinal direction of the collecting holes 66a. Therefore, it is possible to discharge from the wire net member 66. Since the dogging of the collecting holes 66a is suppressed, the oil can be further collected. Therefore, it is possible to maintain the oil separation capacity of the collecting member 65 high.

In the first embodiment, the difference in height h from the oil inlet 62a to the oil outlet 62b is set to be equal to or greater than 100 mm in the drain passage 62 disposed in the cylinder block 2. Thereby, even in a case where the intake negative pressure of the engine body 10 is maximum, it is possible to surely hold the oil surface of the oil head formed in the drain passage 62 in the drain passage 62.

In the first embodiment, the collecting member 65 is configured by overlapping the six wire net members 66 along the flow direction of the blow-by gas. Thereby, it is possible to effectively (surely) collect the oil components from the oil mist by the wire net member 66 overlapped several sheets rather than one sheet. The collecting member 65 is configured of stacking the six wire net members 66. Therefore, even in a case where the fine particles of the oil mist adhering to the frame portion 66c of the wire net joins to be liquid droplets, since it is possible to reduce surface tension of the liquid oil by spreading shape of the frame portion 66c of the wire net, it is possible to rapidly discharge the liquid oil accumulated on the mesh of the wire net (collecting holes 66a) from the collecting member 65 (wire net member 66).

In the first embodiment, the suction passage 61 is the liquid oil separation section that collects the oil of the large particle diameter included in the blow-by gas from the crank chamber 4 by bending between the suction port 61a and the introduction port 61b. The collecting member 65 that partitions the first chamber 51 and the second chamber 52 is the oil mist separation section that collects the oil mist of the small particle diameter included in the blow-by gas after passing through the liquid oil separation section. Thereby, since it is possible to circulate the blow-by gas after the oil of the large particle diameter is mainly collected in the suction passage 61 and content of the oil is reduced into the collecting member 65 of the downstream, in a state where probability of the liquid oil dogging is effectively reduced on the wire net member 66 of the collecting member 65, it is possible to efficiently collect the oil mist by the collecting member 65. It is possible to maintain oil separation function of the oil separator 50 in which the liquid oil separation section and the oil mist separation section are integrated and the number of parts is reduced (became a simple structure) high.

In the first embodiment, the oil separator 50 is disposed at the side of Y2 side of the cylinder block 2 of the engine 100. Thereby, since it is possible to configure to shorten the length of the suction passage 61 from the crank chamber 4 of the lower side of the engine 100 to the oil separator 50, it is possible to rapidly collect the oil mist reduced in diameter by the collecting member 65 (wire net member 66). Since it is possible to configure to shorten the drain passage 62, it is possible to rapidly return the oil discharged from the collecting member 65 (wire net member 66) into the crank chamber 4 (oil pan 5).

First Modification Example of the First Embodiment

The first modification example of the first embodiment will be described with reference to FIG. 9. In the first modification example of the first embodiment, an example disposing a structure (flow-down section 74) that further easily introduces the liquid oil separated into the gas and the liquid into the bottom surface 52a of the second chamber 52 in the lower portion of the collecting member 65 will be described.

Figure 9:
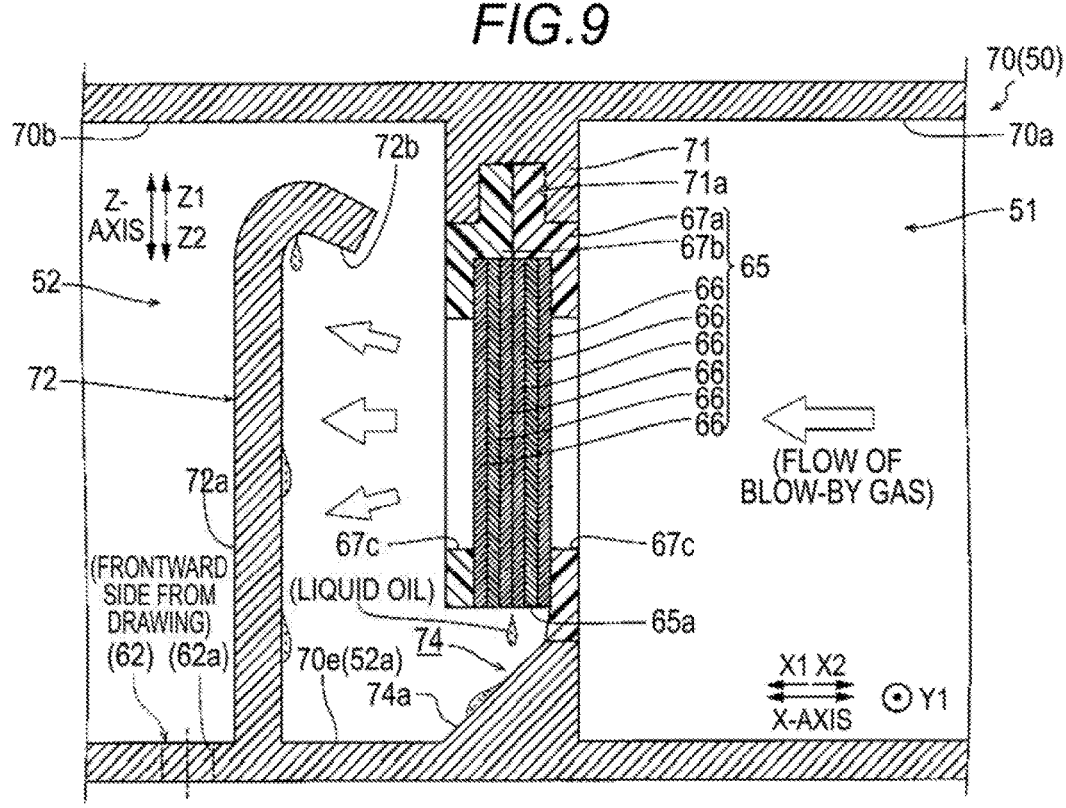
FIG. 9 is a cross-sectional view illustrating an internal structure of an oil separator according to a first modification example of the first embodiment disclosed here.

That is, as illustrated in FIG. 9, the flow-down section 74 is formed at the vicinity of the center and the lower side (Z2 side) portion in the Y-axis direction of the collecting member 65 in the holding section 71. The flow-down section 74 has a surface 74a that is inclined toward the bottom surface 52a of the collision plate 72 side (X2 side) from the lower end section 65a of the collecting member 65. Other configurations are similar to those of the above first embodiment.

Effects of the First Modification Example of the First Embodiment

In the first modification example of the first embodiment, as described above, by disposing the flow-down section 74 having the inclined surface 74a, it is possible to cause the inclined surface 74a to flow down and to cause the liquid oil dropped from the collecting member 65 (wire net member 66) to easily reach the bottom surface 52a. Accordingly, it is possible to recover the oil separated in the collecting member 65 at a high efficiency and to return into the oil pan 5. Other effects of the first modification example of the first embodiment are similar to those of the above first embodiment.

Second Modification Example of the First Embodiment

The second modification example of the first embodiment will be described with reference to FIG. 10. In the second modification example of the first embodiment, an example that causes the six wire net members 66 to be integrated by using a rubber member 68 will be described.

Figure 10:
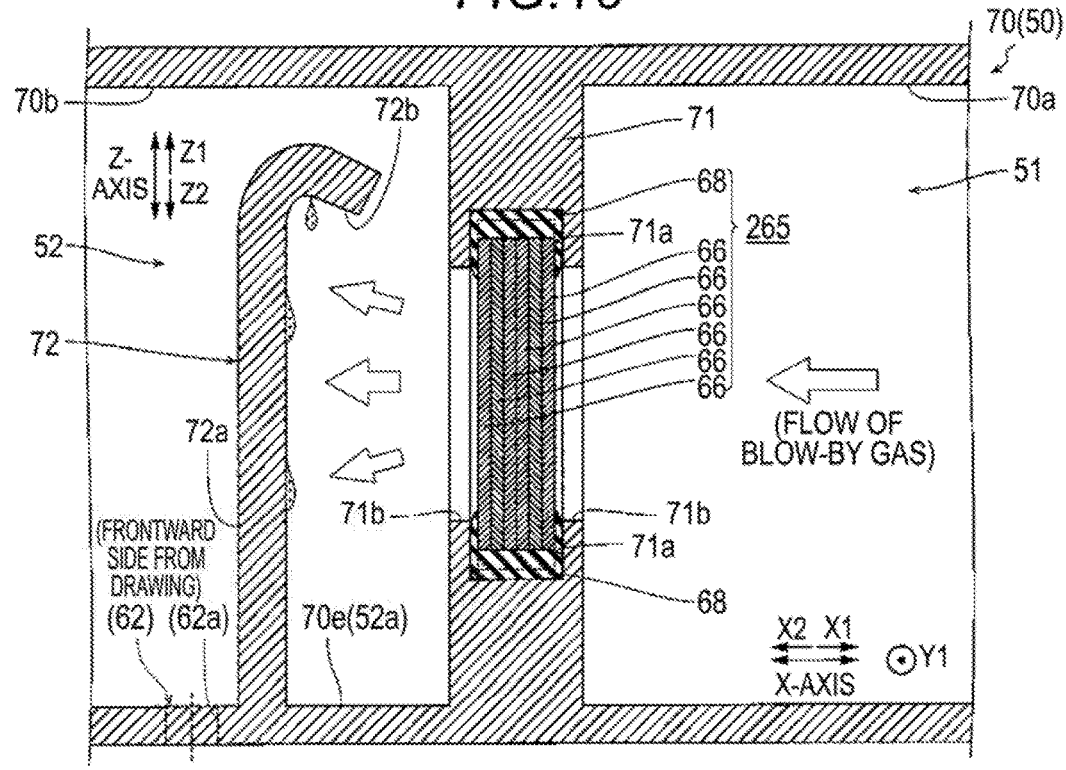
FIG. 10 is a cross-sectional view illustrating an internal structure of an oil separator according to a second modification example of the first embodiment disclosed here.

That is, as illustrated in FIG. 10, the collecting member 265 is mounted on the holding section 71 of the second portion 70. In a state where the six wire net members 66 having the same planar area are overlapped, the rubber member 68 vulcanized around the wire net member 66 is bonded circumferentially to the collecting member 265. Since the rubber member 68 is formed in the frame shape, the wire net member 66 exposed from the opening 71b is formed in a rectangular shape. Other configurations are similar to those of the above first embodiment.

Effects of the Second Modification Example of the First Embodiment

In the second modification example of the first embodiment, as described above, in a state where the six wire net members 66 are overlapped, the vicinity thereof is fixed by using a rubber member 68. Thereby, it is possible to easily integrate the six wire net members 66 by the rubber member 68, and it is possible to accommodate (fix) the collecting member 265 by using the frictional force of the rubber member 68, without rattling in the holding section 71 of the second portion 70. Other effects are similar to those of the above first embodiment.

Third Modification Example of the First Embodiment

The third modification example of the first embodiment will be described with reference to FIGS. 3, 11, and 12. In the third modification example of the first embodiment, an example of forming a collecting member 365 by bending plural times a wire net sheet 366 of one sheet in strip shape, and bending and overlapping six sheets of the wire net members 66 will be described.

Figure 11:
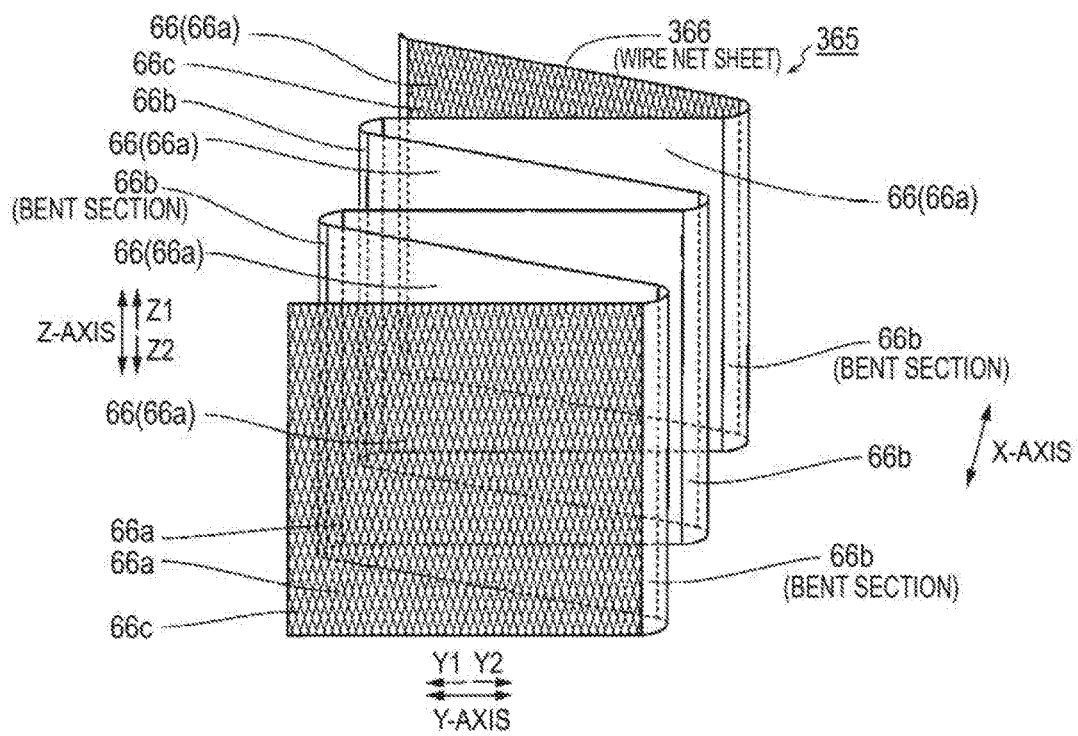
FIG. 11 is a perspective view illustrating a detailed structure of a collecting member according to a third modification example of the first embodiment disclosed here.
Figure 12:
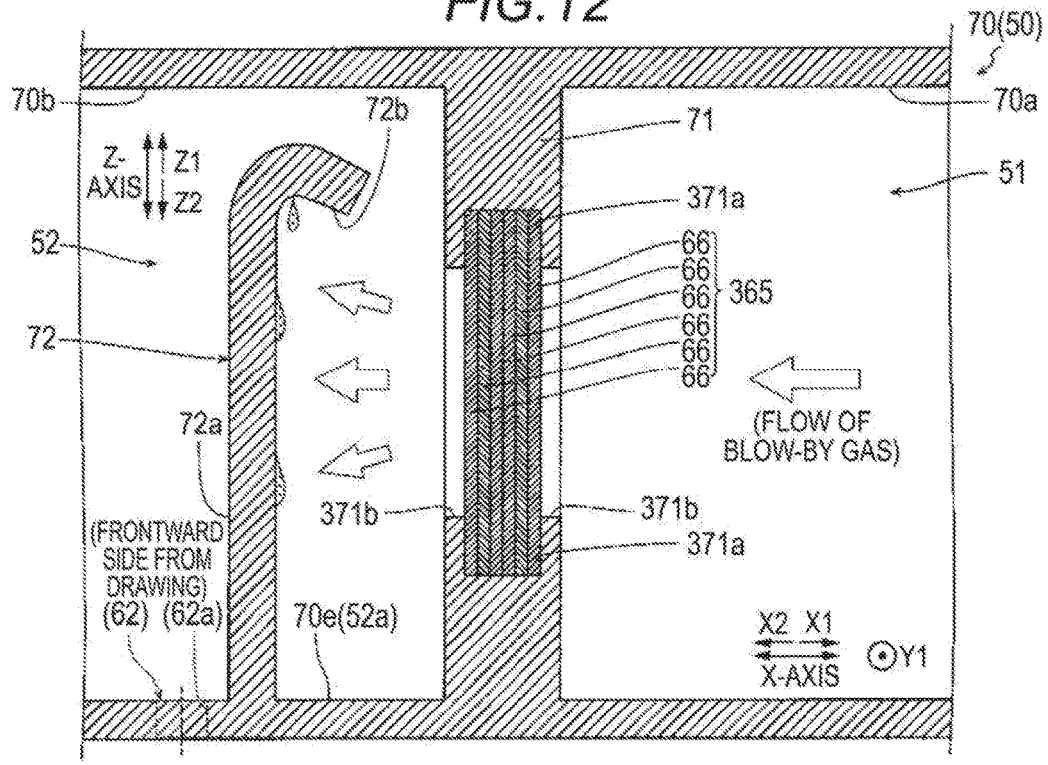
FIG. 12 is a cross-sectional view illustrating the detailed structure of the collecting member according to the third modification example of the first embodiment disclosed here.

That is, as illustrated in FIG. 11, the collecting member 365 is formed by bending plural times the strip shaped wire net sheet 366 which originally is one sheet. In the wire net sheet 366 before bending, a wire net portion 367 having collecting holes 66a and to be expanded metal, and a bent section 66b not having the collecting holes 66a and to be bent are alternately connected. In the bent section 68b, by alternately folding the wire net sheet 366 to the opposite side, the collecting member 365, such as six wire net portions 367 are reciprocally meandering is configured to be formed. In nature state, the collecting member 365 is elongated in the X-axis direction by using elastic force of the bent section 66b.

The holding section 371 of the second portion 70 has the groove section 371a, and the hollowed opening 371b having an inner diameter of approximately 20 mm. As illustrated in FIG. 12, in a state where the direction of extending the bent section 66b (refer to FIG. 11) is aligned in the Z-axis direction (gravity direction), while the collecting member 365 is narrowed and folded in the X-axis direction, the collecting member 365 is inserted in the arrow Y2 direction in the groove section 371a of the holding section 371 and mounted on the second portion 70. Thereby, by using the elastic force (restoring force) of the bent section 66b which is bent, the collecting member 365 is made to be elongated in the X-axis direction, and is configured to be accommodated (fixed) to the groove section 371a of the holding section 371, without rattling. The bent section 66b that positions at Y1 side of the collecting member 365 abuts on the gasket 6 (refer to FIG. 3) without a gap. Other configurations are similar to those of the above first embodiment.

Effects of the Third Modification Example of the First Embodiment

In the third modification example of the first embodiment, as described above, by bending the wire net sheet 366 of the strip shape plural times, the collecting member 365 is configured by overlapping six wire net portions 367 bent each other. Thereby, by using the restoring force of the bent section 66b which is bent, it is possible to accommodate the collecting member 365 in the groove section 371a of the holding section 371, without rattling.

In the third modification example of the first embodiment, in a state where the direction of extending the bent section 66b is aligned in the Z-axis direction (gravity direction), the collecting member 365 is configured by inserting six wire net portions 367 bent each other into the groove section 371a. Thereby, in a case where the direction of extending the bent section 66b is aligned in the Y-axis direction, unlike a case where the oil flowing down the wire net portion 367 is staying in a portion of the bent section 66b without the collecting holes 66a, it is possible to cause the oil collected by the wire net portion 367 along the gravity direction to rapidly and surely flow down, and to surely discharge from the lower end section 65a of the collecting member 365. Other effects of the third modification example of the first embodiment are similar to those of the above first embodiment.

Second Embodiment

Next, an oil separator portion 250 mounted on the engine 200 according to the second embodiment disclosed here will be described with reference to FIGS. 2 and 13 to 18. in the second embodiment, an example of disposing the oil separator portion 250 in the cylinder head cover 90 will be described.

Figure 13:
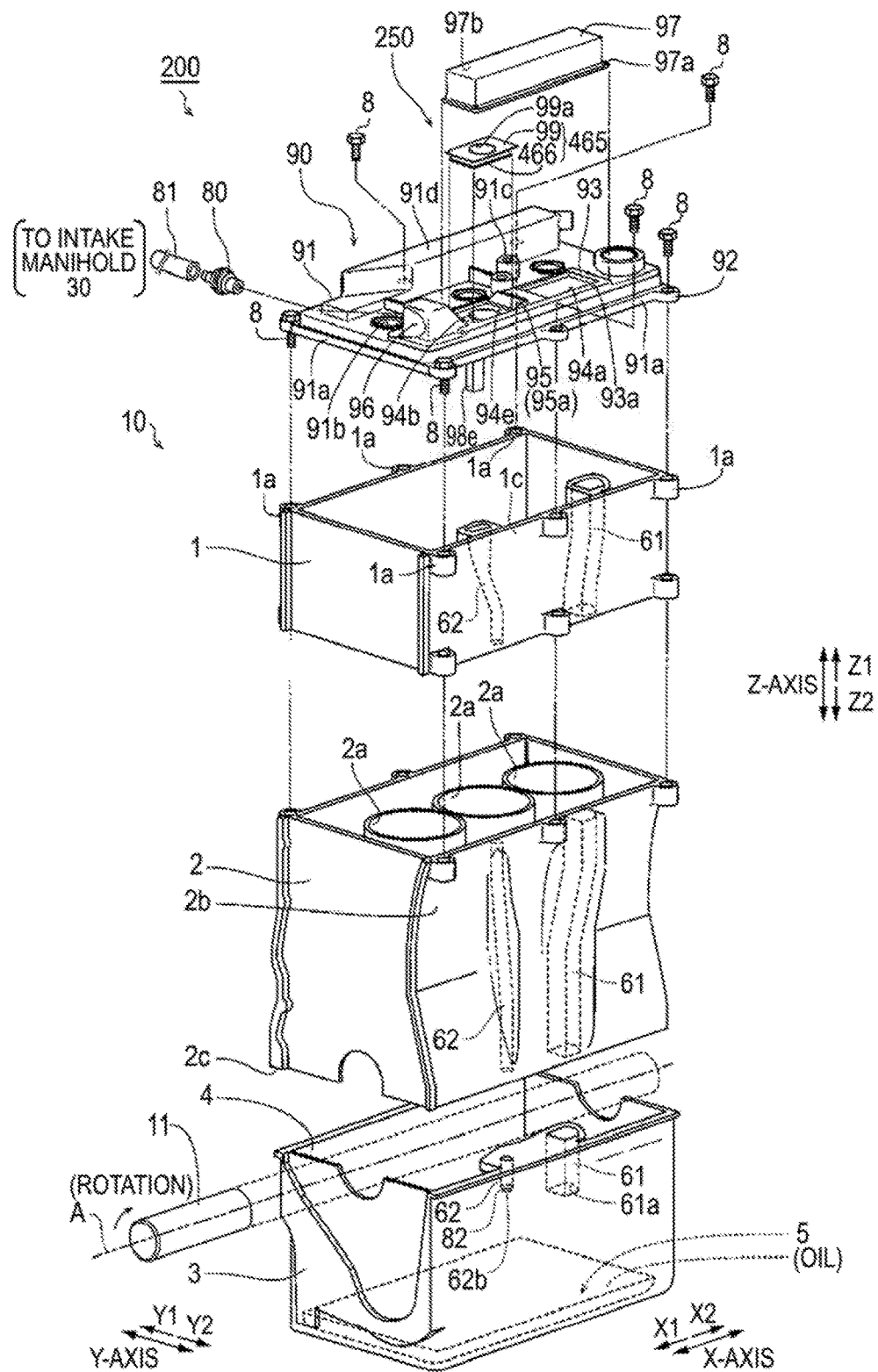
FIG. 13 is an exploded perspective view illustrating a schematic configuration of an engine body according to a second embodiment disclosed here.

In the engine 200 according to the second embodiment disclosed here, as illustrated in FIG. 13, the cylinder head cover 90 made of resin is mounted on each of the flange section 1a of six cylinder heads 1 in the engine body 10, using the bolt member 8. The oil separator portion 250 is disposed in the cylinder head cover 90. The oil separator portion 250 is disposed to extend along a peripheral edge 91a of the cylinder head cover 90 of a position corresponding to a vicinity of the inner wall surface 1c of Y2 side of the cylinder head 1.

Structure of the Cylinder Head Cover

The cylinder head cover 90 is provided with an upper surface section 91, and the flange section 92 integrally formed (connected) in the peripheral edge 91a of the upper surface section 91. A through hole 91b for mounting a fuel injection system and an ignition plug (not illustrated), a boss 91c having a screw hole for mounting a clothing cover (not illustrated) that covers an upper surface of the engine body 10, and a fresh air inlet 91d are disposed in the upper surface section 91 having the complex unevenness shape. A blow-by gas flow path constituting section 93 configuring a portion of the oil separator portion 250 is disposed in a region extending in the X-axis direction (vicinity of the flange section 92) in the peripheral edge 91a of Y2 side of the upper surface section 91.

Figure 14:
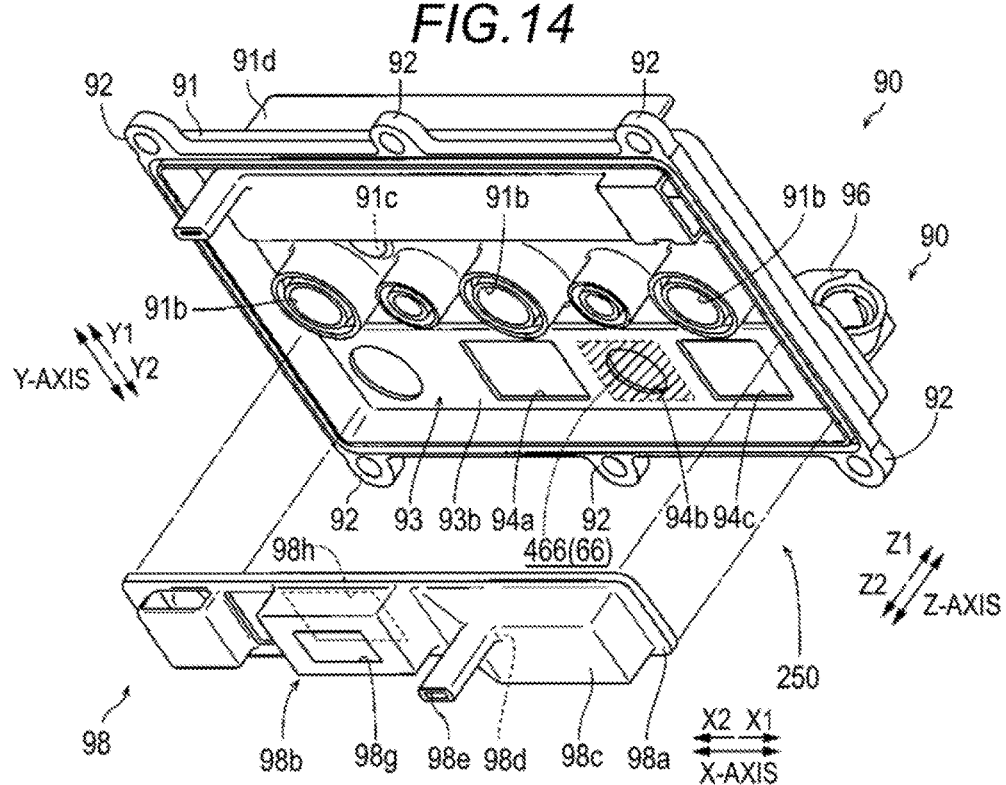
FIG. 14 is an exploded perspective view illustrating a configuration of a cylinder head cover according to the second embodiment disclosed here.
Figure 15:
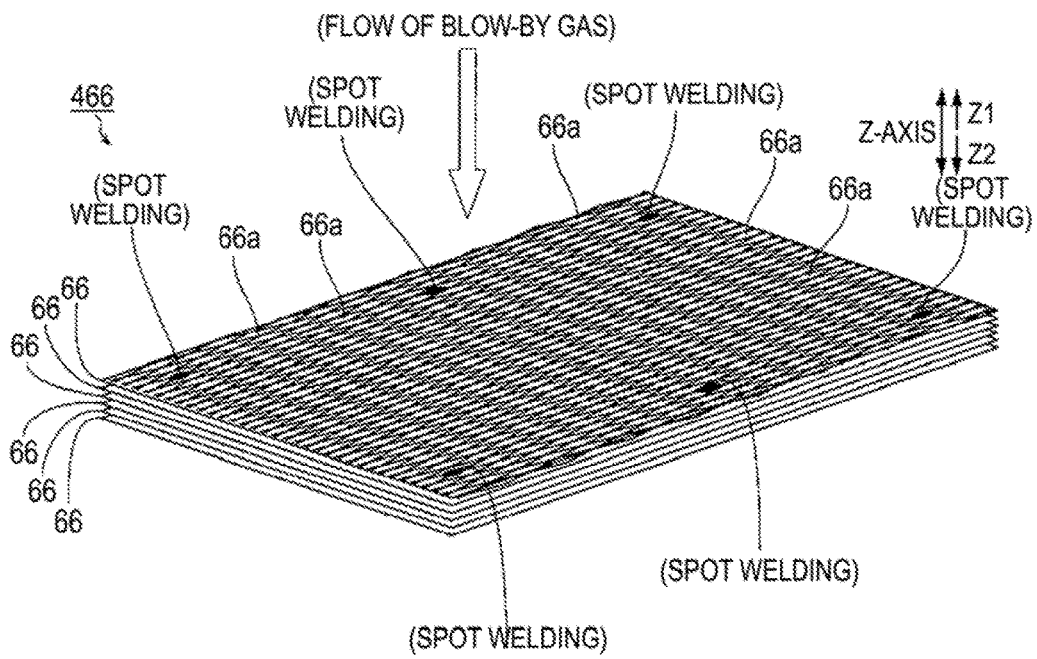
FIG. 15 is a perspective view of a stacked section configuring of a collecting member according to the second embodiment disclosed here.

The blow-by gas flow path constituting section 93 integrally includes a hole 94a, a hole 94b, a hole 94c (refer to FIG. 14), a projection section 95 having an inclined surface 95a projecting to the upper side (Z1 side), and an outlet 96 to which the PCV valve 80 is connected. The cylinder head cover 90 is manufactured as a resin molded product by injecting, filling, cooling and solidifying resin material (such as glass fiber-reinforced polyamide) which is heated and melted into a mold. A lid member 97 is joined by vibration welding in the peripheral edge 93a of the blow-by gas flow path constituting section 93. In the lid member 97 having a recessed shape, in a state of being disposed upside down so that the bottom portion is positioned upwards, the circumferential flange section 97a is joined to the peripheral edge 93a. As illustrated in FIG. 14, in a rear side (inner surface 93b of the Z2 side) of the blow-by gas flow path constituting section 93, a blow-by gas flow path constituting member 98 is joined by vibration welding. In the blow-by gas flow path constituting member 98, the circumferential flange section 98a is joined to the inner surface 93b.

That is, in the second embodiment, as illustrated in FIG. 13, the oil separator portion 250 is configured by the blow-by gas flow path constituting section 93 which is a portion of the upper surface section 91 of the cylinder head cover 90, the lid member 97 covered from Z1 side with respect to the blow-by gas flow path constituting section 93, and the blow-by gas flow path constituting member 98 (refer to FIG. 14) joined from Z2 side with respect to the blow-by gas flow path constituting section 93. As illustrated in FIG. 14, the blow-by gas flow path constituting member 98 integrally has a blow-by gas introduction section 98b which faces the hole 94a and is disposed (formed) so as to project downwards, an oil collection section 98c which collects the oil collected by the collecting member 465 (described later), and the drain passage 98e (an example of discharge passage) disposed at a bottom portion 98d of the oil collection section 98c. The blow-by gas introduction section 98b has the rectangular introduction port 98g, and the rectangular hole 98h formed at the upper side of the introduction port 98g and a position facing the hole 94a. In a state where the cylinder head cover 90 is mounted on the cylinder head 1, the introduction port 98g and the suction passage 61 are abutted to be communicated with each other. The drain passage 98e is formed at a position corresponding to the side (Y1 side) of the collecting member 465.

Here, in the second embodiment, as illustrated in FIG. 13, the oil separator portion 250 has the collecting member 465 covered from the upper side to the hole 94b in the blow-by gas flow path constituting section 93. The collecting member 465 is configured of a stacked section 466 joined by overlapping the plurality of the wire net members 66 (refer to FIG. 15), and the holding member 99 made of resin. More specifically, the stacked section 466 is joined by overlapping plural sheets (six sheets in the embodiment) of the wire net member 66 (refer to FIG. 15) in which a plurality of the collecting holes 66a are arranged in the mesh shape and spot welding. In a state where the stacked section 466 is fitted into the holding section 94e of the rectangular shape (frame shape) formed in the vicinity of the hole 94b, the holding member 99 is covered and joined by the vibration welding. The stacked section 466 is stacked with the individual wire net members 66 along the flow direction (arrow Z2 direction) of the blow-by gas.

The circular opening 99a having the inner diameter of approximately 20 mm is formed in the center region of the holding member 99. That is, in a state where the collecting member 465 is mounted (vibration welding) on the holding section 94e, the wire net member 66 (stacked section 466) exposes to the inner side of the opening 99a. As illustrated in FIG. 14, the wire net member 66 (stacked section 466) exposes to the inner side of the hole 94b. The inner diameter of the hole 94b is larger than the inner diameter of the opening 99a. Except for the exposed region of the wire net member 66 is sandwiched between the holding section 94e and the holding member 99. Thereby, flow of the blow-by gas flowed into the inside of the lid member 97 is throttled by the opening 99a (exposed region of wire net member 66). In a state where the flow rate of the blow-by gas is increased by throttling of the opening 99a, the entire amount thereof passes through the stacked section 466 and is introduced into the oil collection section 98c.

Figure 16:
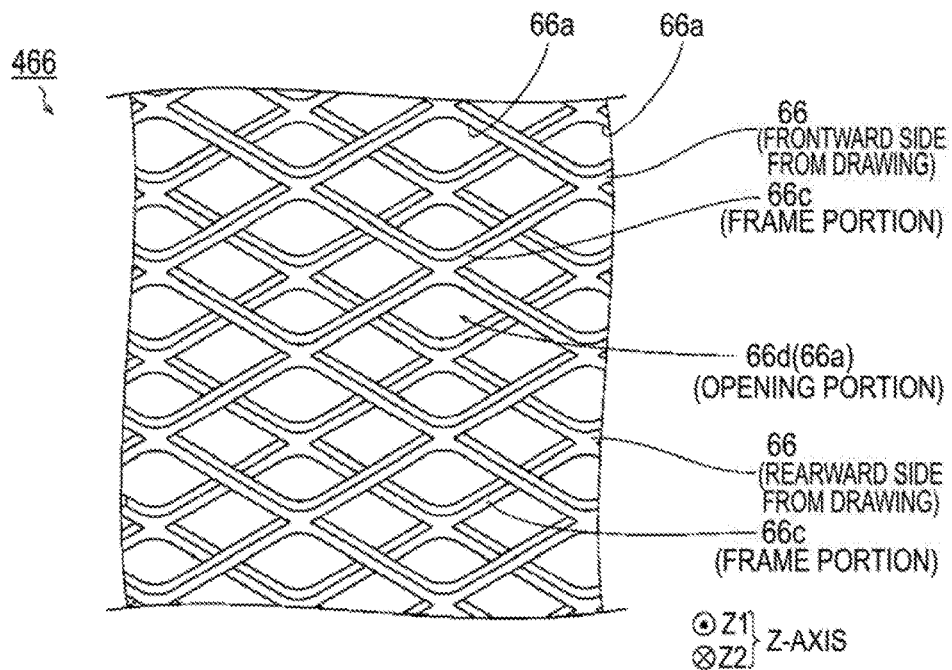
FIG. 16 is a partially enlarged view in a case where the collecting member according to the second embodiment disclosed here is viewed along a flow direction of blow-by gas.

In the second embodiment, as illustrated in FIG. 16, the wire net member 66 is configured such that the collecting holes 66a of the rhombus are arranged in the mesh shape. When viewed from the flow direction (arrow Z2 direction: direction perpendicular to the drawing) of the blow-by gas, the collecting member 465 is disposed so that the frame portion 66c of the collecting holes 66a of the rhombus of one (forward side from the drawing) of the wire net member 66 overlaps an opening portion 66d of the collecting holes 66a of the rhombus of the other (rearward side from the drawing) of the wire net member 66, which are adjacent to each other. In FIG. 16, to easily understand, a state of overlapping two sheets of the wire net members 66 is illustrated for convenience.

Figure 17:
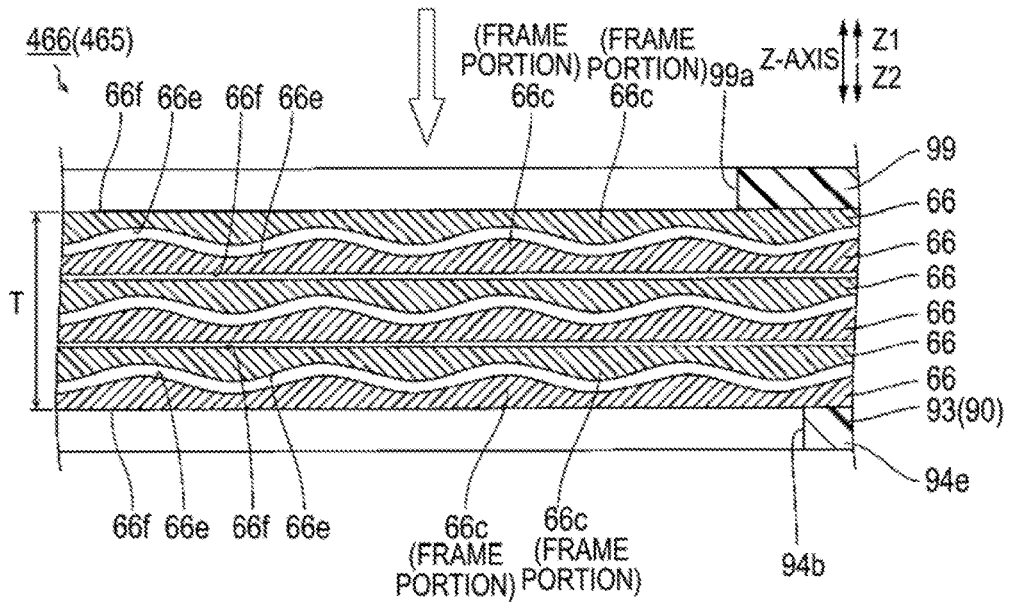
FIG. 17 is a view schematically illustrating a cross-sectional structure of the collecting member according to the second embodiment disclosed here.

As illustrated in FIG. 17, the wire net member 66 has the front surface 66e which is a projection shape side of the frame portion 66c and a rear surface 66f which is a flat surface shape side of the frame portion 66c. That is, after stretching the metal plate in the direction in which the cut is open, the wire net member 66 formed of the expanded metal, on the manufacturing process, is sandwiched between a pair of rolling rollers to face each other (not illustrated) and processed into a sheet shape. At this time, the front surface 66e which is the projection shape side of the frame portion 66c and the rear surface 66f which is the flat surface shape side are formed. In a case of viewing a state stacking a plurality of the wire net members 66 in the horizontal direction (direction parallel to the X-Y plane), and in a state where the front surfaces 66e of the wire net member 66 which are adjacent face each other, and the rear surfaces 66f of the wire net member 66 which are adjacent face each other, the stacked sections 466 are stacked along the flow direction of the blow-by gas. Thereby, the thickness T of the stacked section 466 after stacking is configured to be further reduced. Since the frame portions 66c (refer to FIG. 16) of the collecting holes 66a of the rhombus of the respective wire net members 66 are more closer, an interval of the mesh as the stacked section 466 is more narrowed. Accordingly, the stacked section 466 is configured so that a filling rate (density) of the frame portion 66c per unit volume is more larger. As illustrated in FIG. 13, the collecting member 465 is held so that the wire net member 66 extends in the horizontal direction (direction parallel to the X-Y plane) in the oil separator portion 250. Thereby, the blow-by gas is configured to be circulated in the vertical direction (arrow Z2 direction) and to pass through the plurality of the wire net members 66 (six sheets in the embodiment).

Figure 18:
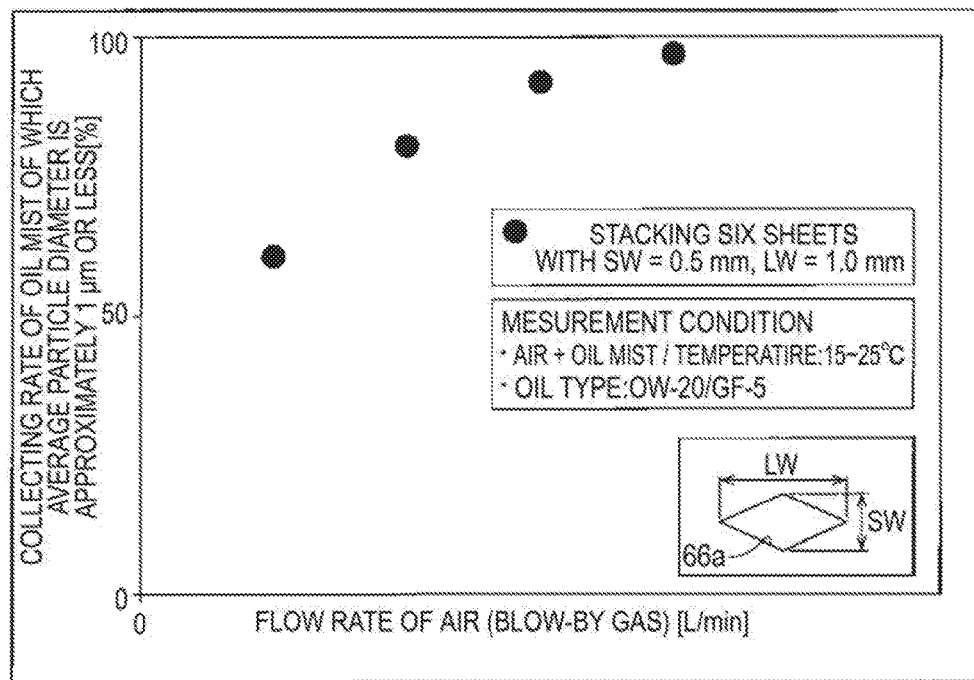
FIG. 18 is a view illustrating a measurement result of collection performance of the collecting member according to the second embodiment disclosed here.

Here, the results of an experiment to measure the oil collection performance of the collecting member 465 is illustrated in FIG. 18. In FIG. 18, the flow rate of the air (blow-by gas) for experiment that includes the oil mist passing through the stacked section 466 is indicated in the horizontal axis, and a collection rate (rate illustrating capacity which does not transmit the oil mist in percentage) of the oil mist in which the average particle diameter is equal to or less than approximately 1 μm is indicated in the vertical axis. In the measurement experiment, in a case of stacking six sheets of the wire net member 66 in which the horizontal width SW is approximately 0.5 mm and the vertical width LW is approximately 1 mm in the collecting holes 66a of the rhombus, performance evaluation of the stacked section 466 (measurement of the collection rate) is performed. As result of the measurement experiment is performed, in a region of equal to or greater than 60 L/minute which is the general flow rate of the blow-by gas, it is demonstrated to have the high collection rate of the oil mist of equal to or greater than approximately 90%.

Function at a Time of the Oil Separator Working

The oil separator portion 250 according to the above configuration functions as follows. As illustrated in FIG. 13, immediately after the start of the engine 200, the blow-by gas is sucked from the suction port 61*a* by the negative pressure of the intake system and is circulated in the suction passage 61. The blow-by gas is circulated in the suction passage 61 in the arrow Z1 direction and performs the inertial collision against the frame portion of the blow-by gas introduction section 98*b* (refer to FIG. 14) of the blow-by gas flow path constituting member 98. Thereby, the oil of the large particle diameter is collected in the suction passage 61 and is returned into the suction port 61*a*. The blow-by gas in which the liquid oil is separated passes through the introduction port 98*g* (refer to FIG. 14) and the hole 98*h* (refer to FIG. 14) disposed in the blow-by gas introduction section 98*b*, passes through upwards the hole 94*a* (refer to FIG. 14) of the blow-by gas flow path constituting section 93, and is introduced into the inside of the lid member 97. The blow-by gas horizontally changes the orientation in the inside of the lid member 97, is circulated in the flow path sandwiched by the inner surface 97*b* of the inclined surface 95*a* and the lid member 97 of the projection section 95, and is introduced into the collecting member 465, while changing downwards the orientation. The blow-by gas is introduced, while the flow rate increase of the blow-by gas flow is achieved in the center region of a passage cross section in the collecting member 465.

In the collecting member 465, when the blow-by gas passes through the stacked section 466 in the arrow Z2 direction via the opening 99*a* (exposed region of the wire net member 66), the oil mist of the small particle diameter (average particle diameter is equal to or less than approximately 1 µm) is collected. That is, since the size (opening size) of the mesh of the wire net formed in the collecting member 465 by stacking several layers (six layers) of the wire net members 66 is micronized, when even the oil mist reduced in diameter (micronized) and in which the mass of the individual particles is very small passes through the micronized mesh of the wire net (complex flow path), the individual particles adheres with a high probability to the frame portion 66*c* of the collecting holes 66*a* of the rhombus shape. The oil collected in the wire net member 66 (stacked section 466) is collected in the oil collection section 98*c*. The oil collected in the bottom portion 98*d* of the oil collection section 98*c* (refer to FIG. 14) is absorbed into the oil head in the drain passage 98*e*. In the drain passage 98*e*, the height of the oil head is maintained so that the water head loss of the oil is larger by a predetermined amount than the pressure loss of the gas flow path side at that point. The oil that exceeds the balance amount of the pressure with the blow-by gas side of the oil head pushes down the check valve 82. Therefore, the oil discharged from the oil outlet 62*b* returns to the oil pan 5. The blow-by gas in which the oil components are separated is introduced into the outlet 96 via the hole 94*c* (refer to FIG. 14) and is recirculated to the intake manifold 30 (refer to FIG. 2) via the PCV valve 80. The engine 200 according to the second embodiment is configured as described above.

Effects of the Second Embodiment

In the second embodiment, as described above, the collecting member 465 includes a plurality of the wire net member 66 stacked along the flow direction of the blow-by gas. Thereby, since it is possible to stack several layers by adjusting the size (opening size) of the mesh (collecting holes 66*a* of the rhombus) that the individual wire net members 66 have, when even the oil mist reduced in diameter (micronized) and in which the mass of the individual particles is very small passes through the mesh of the wire net (complex flow path) in which the size is appropriately adjusted, it is possible to cause the individual particles to adhere to the frame portion 66*c* of the wire net (collecting holes 66*a* of the rhombus shape). Accordingly, for example, unlike a case of separating the oil mist simply by causing the blow-by gas to perform the inertial collision against the collision plate, by using the collecting member 465 formed of a plurality of the wire net members 66 which are stacked, it is possible to surely collect the oil mist reduced in diameter. As a result, it is possible to further improve the separation capacity (collection performance) of the oil mist reduced in diameter and included in the blow-by gas.

In the second embodiment, the collecting member 465 is configured of stacking the six wire net members 66. Therefore, even in a case the fine particles of the oil mist adhering to the frame portion 66*c* of the wire net joins to be liquid droplets, since it is possible to reduce the surface tension of the liquid oil by spreading shape of the frame portion 66*c* of the wire net, it is possible to rapidly discharge the liquid oil accumulated on the mesh of the wire net (collecting holes 66*a*) from the collecting member 465 (wire net member 66).

In the second embodiment, when viewed from the flow direction of the blow-by gas, the collecting member 465 is configured to be disposed so that the frame portion 66*c* of the collecting holes 66*a* having the rhombus shape of one of the wire net member 66 overlaps the opening portion 66*d* of the collecting holes 66*a* having the rhombus shape of the other of the wire net member 66, which are adjacent to each other. Thereby, without reducing the opening area of the collecting holes 66*a* of the rhombus that the individual wire net members 66 have, it is possible to reduce the interval of the mesh (arrangement interval of frame portion 66*c*) in a case of overlapping of a plurality of the wire net members 66. That is, in a state of maintaining a passing resistance of the blow-by gas passing through the collecting member 465 low, it is possible to easily improve the probability in which the individual particles of the oil mist reduced in diameter and included in the blow-by gas passing through the wire net member 66 is brought into contact with and adhered to the frame portion 66*c* of the collecting holes 66*a* of the rhombus. Thereby, it is possible to surely and rapidly collect the oil mist reduced in diameter by using the individual wire net members 66.

In the second embodiment, the collecting member 465 is configured to stack the plurality of the wire net members 66 (six sheets in the embodiment) in which the opening size (vertical width LW) in the longitudinal direction of the collecting holes 66*a* having the rhombus shape is approximately 1 mm and the opening size (horizontal width SW) in the short direction is approximately 0.5 mm. Thereby, since it is possible that the size of the mesh (collecting holes 66*a*) (opening size) of the wire net member 66 formed in the collecting member 465 is micronized, under conditions that the flow rate of the blow-by gas is appropriately ensured, it is possible to collect even the oil mist in which the average particle diameter is equal to or less than approximately 1 µm at a high collection rate (capacity which does not transmit the oil mist) of approximately 90%.

In the second embodiment, in a state where each of the plurality (six sheets) of the wire net members 66 are stacked along the flow direction of the blow-by gas, the wire net members 66 are joined to each other. Thereby, since it is possible to configure the collecting member 465 in a state where the individual wire net members 66 is joined to each other and is a single member, on the manufacturing process, it is possible to easily mount the collecting member 465 which is the single member on the inside of the oil separator portion 250.

In the second embodiment, in a state where the front surfaces 66e of the wire net members 66 which are adjacent face each other, and the rear surfaces 66f of the wire net members 66 which are adjacent face each other, the collecting member 465 is configured to be stacked along the flow direction of the blow-by gas. Thereby, in a state where a frame section and the collecting holes 66a are faced each other so that the frame section of the projection shape of the front surface 66e of one of the wire net members 66 are fitted into the collecting holes 66a of the other of the wire net members 66, and the rear surfaces 66f having the frame section of the flat surface shape of the one and the other of the wire net members 66 are faced each other, it is possible to stack each of the wire net members 66. Accordingly, it is possible to reduce the thickness T of the collecting member 465 after stacking (refer to FIG. 17), as much as the wire net members 66 facing each other can be further closer to be stacked. That is, since it is possible to stack the individual wire net members 66 with high density, it is possible to obtain the collecting member 465 of compact and high collecting capacity, as much as a filling rate of the mesh is improved.

In the second embodiment, the oil separator portion 250 is disposed in the cylinder head cover 90 of the engine 200. Thereby, it is possible to collect the oil mist in the cylinder head cover 90 by easily passing through the blow-by gas that is circulated in the vertical direction from the crank chamber 4 of the lower side of the engine 200 and sucked in the cylinder head cover 90 in the collecting member 465 (wire net member 66). It is possible to easily form the drain passage 98e along the vicinity of the inner wall surface 1c of the cylinder head 1 for the oil collected by the collecting member 465 (wire net member 66) is returned into the crank chamber 4 (oil pan 5).

In the second embodiment, the oil separator portion 250 is disposed along the peripheral edge 91a of the cylinder head cover 90 at position corresponding to the vicinity of the inner wall surface 1c of the cylinder head 1 of the engine 200. Thereby, without physically being interfered in such as a timing member of valve system (inlet valve and exhaust valve) of the upper side of the cylinder 2a, it is possible to dispose the oil separator portion 250 in the inside of the cylinder head cover 90.

In the second embodiment, the oil separator portion 250 includes the drain passage 98e that discharges the oil separated from the blow-by gas, and the drain passage 98e is disposed at the side of the collecting member 465. Thereby, since the collecting member 465 and an entrance of the drain passage 98e of the oil are shifted positional relationship to each other, the oil collected by the collecting member 465 (wire net member 66) and drips can be prevented from being again taken away into the intake system (intake manifold 30) of the engine 200 along with the flow of the blow-by gas. The oil that flows down along the inside flow path from the collecting member 465 to the entrance of the drain passage 98e can be surely introduced into the drain passage 98e. Other effects are similar to those of the above first embodiment.

Modification Example

It should be appreciated that the embodiment disclosed this time is examples in all aspects, without being limited examples. The scope of disclosed here is defined by the scope of the aspects rather than by the description of the above embodiments, and further includes all modifications (modified example) within the equivalent meaning and scope to the aspects.

For example, in the above first embodiment and the first to third modification examples, although the first portion 60 is integrally formed in the cylinder block 2, this disclose is not limited thereto. The first portion 60 may be configured separately from the cylinder block 2, and the oil separator that previously mounts the first portion 60 and the second portion 70 may be fixed to the side wall section 2b of the cylinder block 2.

In the above first embodiment and the first to third modification examples, although the oil outlet 62b of the drain passage 62 is positioned downwards than the lower end surface 2c of the cylinder block 2, this disclose is not limited thereto. That is, the oil outlet 62b may be positioned the height of the tower end surface 2c.

In the above first embodiment and the first to third modification examples, although the oil separator 50 is disposed on the side wall section 2b of Y2 side of the cylinder block 2, this disclose is not limited thereto. That is, depending on the mounting direction of the engine 100, the oil separator 50 may be disposed in a location other than the side wall section 2b of Y2 side of the cylinder block 2.

In the above first embodiment and the first to third modification examples, although the second portion 70 (cover member) is configured by using of aluminum alloy, this disclose is not limited thereto. For example, the second portion 70 may be configured by using resin material having oil resistance, heat resistance, chemical resistance and sufficient strength (nylon-based resin material including glass fibers). In this case, the six wire net members 66 may be integrally formed during manufacturing of the second portion 70 by using an insert molding method.

In the above first embodiment and the first to third modification examples, although the collecting members 65 (265 and 365) are configured by overlapping six sheets of the wire net member 66 having one kind of the mesh roughness, this disclose is not limited thereto. That is, the collecting members 65 (265 and 365) may be configured by combining a plurality of the wire net members (two or more) having the different mesh roughness from each other.

In the above first embodiment and the first to third modification examples, although the return section 72b is disposed in the collision plate 72, this disclose is not limited thereto. Without disposing the return section 72b, "collision plate" such as the wall section 72a is slightly inclined forward toward the collecting member 65 to the bottom surface 70e may be disposed.

In the above first embodiment and the first to third modification examples, although the check valve 82 is disposed in the drain passage 62, this disclose is not limited thereto. Without disposing the check valve 82, the drain passage 62 may be configured so that the cross-sectional area S2 of the oil outlet 62b is narrower than the cross-sectional area S1 of the oil inlet 62a. In this case, the inner diameter may be gradually or stepwise reduced from the oil inlet 62a toward the oil outlet 62b, and the drain passage 62 may be configured to throttle in the vicinity of the oil outlet 62b.

In the above first embodiment, although the collecting member 65 is configured by sandwiching the six wire net members 66 with the pair of the holding members 67a and 67b, this disclose is not limited thereto. That is, the collecting member 265 according to the above second modification example may be mounted on the second portion 70 by sandwiching the holding members 67a and 67b (refer to FIG. 5). The collecting member 365 according to the above third modification example may be mounted on the second portion 70 by sandwiching the holding members 67a and 67b (refer to FIG. 5).

In the above first embodiment and the first to third modification examples, although the first chamber 51 and the second chamber 52 are disposed at the same height, when viewed from the horizontal direction (X-axis direction), this disclose is not limited thereto. The first portion 60 and the second portion 70 may be formed so that the first chamber 51 is relatively obliquely disposed downward, and the second chamber 52 is relatively obliquely disposed upward by interposing the collecting member 65. It is possible to easily ensure the difference in height h of the drain passage 62, as much as the bottom surface 52a of the second chamber 52 is disposed further upwards.

In the above first embodiment and the first to third modification examples, although the blow-by gas is recirculated to the intake manifold 30 by disposing one PCV valve 80 in the oil separator 50 in the engine 100 of the natural intake type, this disclose is not limited thereto. That is, in addition to the PCV valve 80 in the internal combustion engine with a supercharger, the second PCV valve (control valve) may be further disposed to allow the blow-by gas to be recirculated at the portion of the intake passage upstream of the intake side supercharger (compressor).

In the above first embodiment and the first to third modification examples, although an example of applying this disclosure to the engine 100 for the vehicle is described, this disclose is not limited thereto. For example, this disclosure may be applied to the oil separator 50 mounted on the internal combustion engine of equipment.

Figure 19:
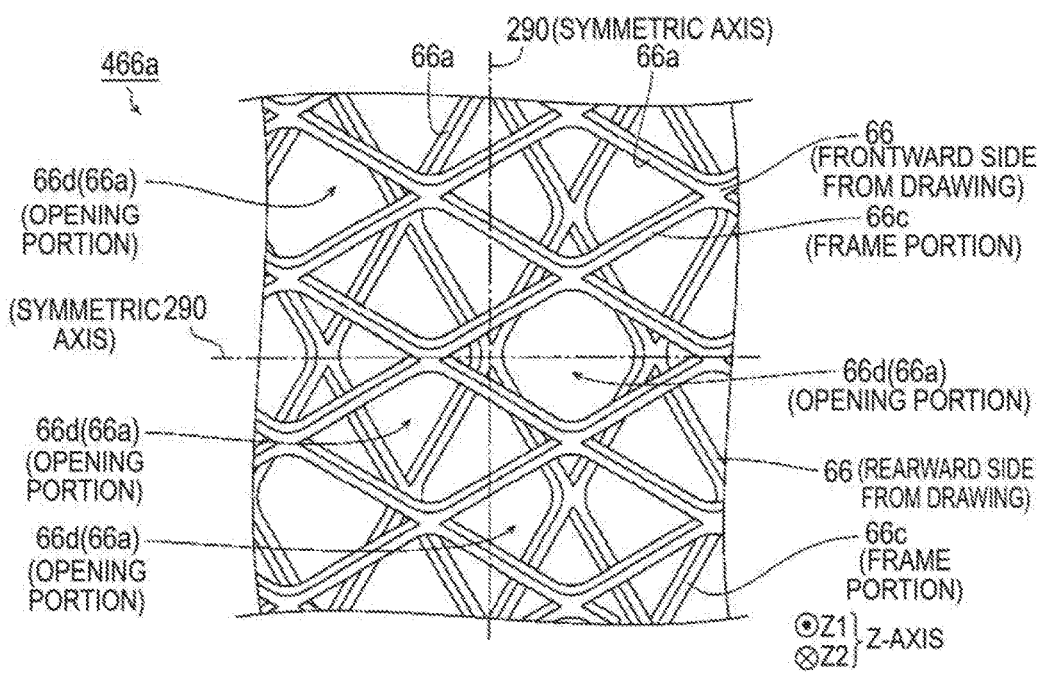
FIG. 19 is a partially enlarged view in a case where the collecting member according to a modification example of the second embodiment disclosed here is viewed along the flow direction of the blow-by gas.

In the second embodiment, in a state where the front surfaces 66e face each other and the rear surfaces 66f face each other, which are adjacent, although the wire net members 66 are stacked, this disclose is not limited thereto. For example, as the modification example as illustrated in FIG. 19, the stacked section 466a may be configured. Specifically, as illustrated in FIG. 19, when viewed from the flow direction (direction perpendicular to the drawing) of the blow-by gas, the stacked sections 466a may be disposed so as to overlap each other in a state where symmetric axes 290 intersect (orthogonal to) each other along the longitudinal direction of the collecting holes 66a of the rhombus of the wire net members 66 which are adjacent to each other. Thereby, it is possible to stack by further complicatedly overlapping the frame portion 66c of the collecting holes 66a of the rhombus of one of the wire net member 66 in the opening portion 66d of the collecting holes 66a of the rhombus of the other of the wire net member 66. Accordingly, without reducing the opening area of the collecting holes 66a of the rhombus that the individual wire net members 66 has, the interval of the mesh in the case where a plurality of the wire net members 66 overlap each other can be easily narrowed. In FIG. 19, to easily understand, a state of overlapping two sheets of the wire net members 66 is illustrated for convenience.

In the above first and second embodiments, although the collecting members 65 (265, 365, and 465) are configured by stacking the wire net members 66 in which the collecting holes 66a having the opening shape of the rhombus are arranged in the mesh shape, this disclose is not limited thereto. For example, "the collecting member" disclosed here may be configured by stacking the wire net members in which the collecting holes having the opening shape of at least any of a parallelogram including a rectangle other than the rhombus (however, a square is excluded) and an ellipse are arranged in the mesh shape.

In the above first and second embodiments, although the collecting members 65 (265, 365, and 465) are configured by stacking six sheets of the wire net members 66 in which the opening size (vertical width LW) of the longitudinal direction of the collecting holes 66a of the rhombus is approximately 1 mm, and the opening size (horizontal width SW) of the short direction is approximately 0.5 mm, this disclose is not limited thereto. For example, "collecting member" disclosed here may be configured by further increasing the number of stacked layers of the wire net members 66, if the opening area of the collecting holes 66a is larger.

An oil separator according to an aspect of this disclosure includes a collecting member that collects an oil mist included in blow-by gas of an internal combustion engine, and an oil separator portion inside which the collecting member is disposed, and the collecting member includes a plurality of wire net members stacked along a flow direction of the blow-by gas.

In the oil separator according to the aspect of this disclosure, as described above, the collecting member includes a plurality of wire net members stacked along a flow direction of the blow-by gas. Thereby, since it is possible to stack several layers by adjusting the size (opening size) of the mesh (collecting hole) that the individual wire net members have, even when the oil mist reduced in diameter (micronized) and in which the mass of the individual particles is very small passes through the mesh of the wire net (complex flow path) in which the size is appropriately adjusted, it is possible to cause the individual particles to adhere to a frame portion of a wire net. Accordingly, for example, unlike a case of separating the oil mist simply by causing the blow-by gas to perform the inertial collision against the collision plate, by using the collecting member formed of a plurality of the wire net members which are stacked, it is possible to surely collect the oil mist reduced in diameter. As a result, it is possible to further improve the separation capacity (collection performance) of the oil mist reduced in diameter and included in the blow-by gas.

In the oil separator according to the aspect of this disclosure, the collecting member is configured of stacking a plurality of the wire net members. Therefore, even in a case the fine particles of the oil mist adhering to the frame portion of the wire net joins to be liquid droplets, since it is possible to reduce a surface tension of the liquid oil by spreading shape of the frame portion of the wire net, it is possible to rapidly discharge the liquid oil accumulated on the mesh of the wire net from the collecting member (wire net member). As compared with the case of disposing a demister, such as a filter made of a filter paper or a wire mesh (metal scrub brush) having irregularities, since the individual wire net members are excellent in discharge performance of the liquid oil, the liquid oil is suppressed from clogging on the wire net member even when the wire net members are stacked of plural sheets. Therefore, it is possible to maintain the passing resistance (pressure loss) of the blow-by gas low. Thereby, it is possible to appropriately ensure a flow rate of the blow-by gas that passes through the collecting member. As a result, by rapidly discharging the liquid oil collected from the blow-by gas, the flow rate of the blow-by gas is appropriately ensured. Therefore, it is possible to maintain ventilation performance of the blow-by gas.

In the oil separator according to the aspect of this disclosure, it is preferable that the wire net member is configured such that collecting holes which have opening shapes of at least any one of a parallelogram including a rectangle and a rhombus, and an ellipse are arranged in mesh shapes, and when viewed from the flow direction of the blow-by gas, the collecting member is disposed so that a frame portion of the collecting holes having the opening shape of one of the wire net member overlaps an opening portion of the collecting holes having the opening shape of the other of the wire net member, which are adjacent to each other.

According to this configuration, without reducing an opening area of the collecting holes having the opening shape of at least any of the parallelogram including the rectangle and the rhombus, and the ellipse disposed in the individual wire net members, it is possible to reduce the interval of the mesh (arrangement interval of the frame portion of the collecting holes) in a case of overlapping of a plurality of the wire net members. That is, in a state of maintaining a passing resistance of the blow-by gas passing through the collecting member low, it is possible to easily improve the probability in which the oil mist reduced in diameter and included in the blow-by gas passing through the wire net member is brought into contact with and adhered to the frame portion of the collecting holes having the opening shape. Thereby, it is possible to surely and rapidly collect (catch) the oil mist reduced in diameter by the individual wire net members.

In the configuration in which the collecting holes having the opening shape of at least any of the parallelogram including the rectangle and the rhombus, and the ellipse in the above wire net member are arranged in the mesh shape, it is preferable that each of the plurality of the wire net members is joined each other in a state of being stacked along the flow direction of the blow-by gas.

According to this configuration, since it is possible to configure the collecting member in a state where the individual wire net members is joined each other and is a single member, on the manufacturing process, it is possible to easily mount the collecting member which is the single member on the inside of the oil separator portion.

In the configuration in which the collecting holes having the opening shape of at least any of the parallelogram including the rectangle and the rhombus, and the ellipse in the above wire net member are arranged in the mesh shape, it is preferable that the wire net member has a front surface having a frame section with a projection shape and a rear surface having a frame section with a flat surface shape, and the collecting members are stacked along the flow direction of the blow-by gas in a state where the front surfaces of the wire net members which are adjacent face each other, and the rear surfaces of the wire net members which are adjacent face each other. In "parallelogram" in the aspect of this disclosure, so-called a square is not included.

According to this configuration, in a state where a frame section and the collecting holes are faced each other so that the frame section of the projection shape of the front surface of one of the wire net members are fitted into the collecting holes of the other of the wire net members, and the rear surfaces having the frame section of the flat surface shape of the one and the other of the wire net members are faced each other, it is possible to stack each of the wire net members. Accordingly, it is possible to reduce the thickness of the collecting member after stacking, as much as the wire net members facing each other can be further closer to be stacked. That is, since it is possible to stack the individual wire net members with high density, it is possible to obtain the collecting member of compact and high collecting capacity, as much as a filling rate of the mesh is improved.

In the oil separator according to the aspect of this disclosure, it is preferable that the oil separator portion is disposed on a cylinder head cover of the internal combustion engine.

According to this configuration, it is possible to collect the oil mist in the cylinder head cover by easily passing through the blow-by gas that is circulated in the vertical direction from a crank chamber of a lower side of the internal combustion engine and drawn into the cylinder head cover in the collecting member (wire net member). It is possible to easily form an oil drain passage along the vicinity of an inner wall surface of the cylinder head for the oil collected by the collecting member (wire net member) to return into the crank chamber (oil pan).

In the oil separator according to the aspect of this disclosure, it is preferable that the oil separator portion is disposed at a side of a cylinder block of the internal combustion engine.

According to this configuration, since it is possible to configure to shorten the vertical length from the crank chamber of the lower side of the internal combustion engine to the oil separator portion, it is possible to rapidly collect the oil mist reduced in diameter by the collecting member (wire net member). Since it is possible to configure to shorten the drain passage (discharge passage) of the oil, it is possible to rapidly return the oil discharged from the collecting member (wire net member) into the crank chamber (oil pan).

In the oil separator according to the aspect of this disclosure, it is preferable that the oil separator portion includes a discharge passage that discharges oil separated from the blow-by gas, and the discharge passage is disposed at a side of the collecting member.

According to this configuration, since the collecting member and an entrance of the discharge passage of the oil have shifted positional relationship to each other, the oil which is collected by the collecting member (wire net member) and drips can be prevented from being again taken away into the intake system of the internal combustion engine along with the flow of the blow-by gas. The oil that flows down along the inside flow path from the collecting member to the entrance of the discharge passage can be surely introduced into the discharge passage.

In the oil separator according to the aspect of this disclosure, following configuration is also conceivable.

APPENDIX 1

That is, in the oil separator according to the aspect, the collecting member is disposed so as to overlap in a state where symmetric axes intersect with each other along a longitudinal direction of the collecting holes of the rhombus of the wire net member which are adjacent to each other, when viewed from the flow direction of the blow-by gas.

APPENDIX 2

In the oil separator according to the aspect of this disclosure, the oil separator portion is disposed at a downstream side of the collecting member, and includes a control valve that controls the flow of the blow-by gas.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An oil separator comprising:
a collecting member that collects an oil mist included in blow-by gas of an internal combustion engine; and
an oil separator portion inside which the collecting member is disposed,
wherein the collecting member includes a plurality of wire net members stacked along a flow direction of the blow-by gas,
wherein each of the wire net members is configured such that collecting holes which have opening shapes of at least any one of a parallelogram including a rectangle and a rhombus, and an ellipse are arranged in mesh shapes,
wherein when viewed from the flow direction of the blow-by gas, the collecting member is disposed so that a frame portion of the collecting holes having the opening shape of one of the wire net members overlaps an opening portion of the collecting holes having the opening shape of an other of the wire net members, which are adjacent to each other,
wherein each of the wire net members has a front surface having a frame section with a projection shape and a rear surface having a frame section with a flat surface shape, and
wherein the collecting members are stacked along the flow direction of the blow-by gas in a state where the front surfaces of the wire net members which are adjacent face each other, and the rear surfaces of the wire net members which are adjacent face each other.

2. The oil separator according to claim 1,
wherein each of the plurality of the wire net members is joined each other in a state of being stacked along the flow direction of the blow-by gas.

3. The oil separator according to claim 1,
wherein the oil separator portion is disposed on a cylinder head cover of the internal combustion engine.

4. The oil separator according to claim 2,
wherein the oil separator portion is disposed on a cylinder head cover of the internal combustion engine.

5. The oil separator according to claim 1,
wherein the oil separator portion is disposed at a side of a cylinder block of the internal combustion engine.

6. The oil separator according to claim 2,
wherein the oil separator portion is disposed at a side of a cylinder block of the internal combustion engine.

7. The oil separator according to claim 1,
wherein the oil separator portion includes a discharge passage that discharges oil separated from the blow-by gas, and
wherein the discharge passage is disposed at a side of the collecting member.

8. The oil separator according to claim 2,
wherein the oil separator portion includes a discharge passage that discharges oil separated from the blow-by gas, and
wherein the discharge passage is disposed at a side of the collecting member.

9. The oil separator according to claim 3,
wherein the oil separator portion includes a discharge passage that discharges oil separated from the blow-by gas, and
wherein the discharge passage is disposed at a side of the collecting member.

* * * * *